US011087366B2

(12) United States Patent
Pham

(10) Patent No.: US 11,087,366 B2
(45) Date of Patent: Aug. 10, 2021

(54) AUTOMATICALLY MODIFYING A DISRUPTED PACING PLAN FOR A DIGITAL CONTENT DISTRIBUTION CAMPAIGN

(71) Applicant: Facebook, Inc., Menlo Park, CA (US)

(72) Inventor: Tung Nhat Pham, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 377 days.

(21) Appl. No.: 15/723,119

(22) Filed: Oct. 2, 2017

(65) Prior Publication Data
US 2019/0102807 A1    Apr. 4, 2019

(51) Int. Cl.
*G06Q 30/02*   (2012.01)
(52) U.S. Cl.
CPC ..... *G06Q 30/0275* (2013.01); *G06Q 30/0249* (2013.01); *G06Q 30/0272* (2013.01)
(58) Field of Classification Search
CPC . G06Q 30/0207–0277; G06Q 30/0275; G06Q 30/0272; G06Q 30/0249
See application file for complete search history.

(56) References Cited

U.S. PATENT DOCUMENTS

| | | | | |
|---|---|---|---|---|
| 2012/0303464 A1* | 11/2012 | Gorman | ................. | G06Q 30/02 705/14.71 |
| 2013/0124308 A1* | 5/2013 | Hegeman | ........... | G06Q 30/0241 705/14.48 |
| 2014/0297400 A1* | 10/2014 | Sandholm | .......... | G06Q 30/0243 705/14.42 |
| 2016/0180373 A1* | 6/2016 | Xu | ..................... | G06Q 30/0244 705/14.43 |
| 2018/0108049 A1* | 4/2018 | Kitts | .................. | G06Q 30/0272 |

OTHER PUBLICATIONS

OwnerIQ; OwnerIQ upgrades predictive, mid-funnel ad technology. (Feb. 8, 2014). Marketing Weekly News Retrieved from http://dialog.proquest.com (Year: 2014).*
P. Murali, Ying Li, P. Mazzoleni and R. Vaculin, "Optimal budget allocation strategies for real time bidding in display advertising," 2015 Winter Simulation Conference (WSC), Huntington Beach, CA, 2015, pp. 3146-3147. (Year: 2015).*
Xu, J. et al. "Smart Pacing for Effective Online Ad Campaign Optimization." Proceedings of the 21th ACM SIGKDD International Conference on Knowledge Discovery and Data Mining (2015): n. pag. (Year: 2015).*

* cited by examiner

*Primary Examiner* — Eric R Netzloff
*Assistant Examiner* — Michael R Stibley
(74) *Attorney, Agent, or Firm* — Keller Jolley Preece

(57) ABSTRACT

The present disclosure is directed toward systems, computer-readable media, and methods that automatically modify a pacing plan for a digital content distribution campaign, which provides digital content to client computing devices based on the pacing plan. For instance, the systems disclosed herein can automatically detect when a service error causes a digital content distribution campaign to deviate from the pacing plan. In response, the disclosed systems can generate a new pacing plan based on the actual allocated budget at the conclusion of the service error. In particular, the disclosed systems can generate a new pacing plan that enables the digital content distribution campaign to efficiently maximize the remaining resources allocated to the digital content distribution campaign.

20 Claims, 13 Drawing Sheets

AUTOMATICALLY MODIFYING A DISRUPTED PACING PLAN FOR A DIGITAL CONTENT DISTRIBUTION CAMPAIGN

BACKGROUND

Advancements in computing devices and networking technology have led to a variety of innovations in providing targeted digital content across computer networks. For example, online digital content systems are now able to instantly serve targeted digital content to users spanning the globe. Indeed, whether in entertainment, employment, or advertising, modern online digital content systems are able to provide instantaneous targeted digital content to thousands of users via various types of client devices.

Despite these advances, however, digital content systems continue to have a number of problems. To illustrate, modern online advertising systems can execute digital advertising campaigns and provide targeted advertisements to selected users (e.g., a targeted audience) utilizing one or more online applications or services and via different computing networks. Yet, when service errors occur, modern online advertising systems are prohibited from serving the targeted advertisements to the targeted audience. For example, a communication fault between a first area and a second area can prevent modern online advertising systems from serving targeted advertisements to selected users in the second area. Similarly, an employee of modern online advertising system can inadvertently introduce an error (e.g., a programming error) that prevents the modern online advertising system from serving targeted advertisements to users in a targeted audience.

Such service errors can have significant adverse effects on modern online advertising systems and corresponding advertisers. For example, many modern online advertising systems implement digital advertising campaigns based on an allocation schedule (e.g., a pacing plan that includes a schedule for bidding on impression opportunities via an online auction). When a modern online advertising system experiences a service error, such digital advertising campaigns can deviate significantly from their allocation schedule, causing significant spiking in costs and bids.

Indeed, after a service error, digital advertising campaigns with an allocation schedule will often significantly ramp up bidding and purchasing of advertisements (e.g., by setting the bid value of advertisements at their highest possible value) in an attempt to realign with the allocation schedule. As digital advertising campaigns submit max bids, the online advertising system experiences a significant spike in the number and value of bids.

Unfortunately, bidding spikes inefficiently consume allocated resources of the online advertising system and advertisers. For example, a digital advertising campaign for an advertiser can easily spend over half of an allocated budget for a day in under an hour during a bidding spike. Thus, bidding spikes cause advertisers to spend more per advertisement, which reduces the total number of served advertisements given an advertiser's allocated budget. Thus, advertisers ultimately achieve less effective digital advertising campaigns.

Moreover, bidding spikes also tax the resources of modern online advertising system. Indeed, on the heels of a service error, online advertising systems are usually bombarded with a significant increase in bids and bid prices (often followed by a significant lull in bids and bid prices after advertisers burn through their allocated budget). Accordingly, modern online advertising systems can inefficiently overburden computer processing and storage resources after a service error (and/or inefficiently underutilize computing resources as bids and/or bid values plummet after a bid spike).

Many of the problems of these conventional systems are a direct result of the volume and speed of modern online digital content distribution systems, which exchange digital content between a plurality of computing devices utilizing computer networks nearly instantaneously. Indeed, in order to provide digital content in real-time, modern online advertising systems apply complex digital parameters to select and provide digital content to millions (or even billions) of client computing devices interfacing via global computer networks. Application of these digital parameters across such complex systems requires digital plans for expending resources and also routinely results in system service errors. As service errors are resolved, modern online advertising systems applying digital parameters in real-time for thousands of advertisers serving digital content to millions of clients results in inefficient use of resources (e.g., bid spiking).

These and other problems exist with regard to providing digital content (e.g., advertisements) to client devices over computing networks.

SUMMARY

Embodiments described herein provide benefits and/or solve one or more of the foregoing or other problems in the art by providing systems, computer-readable media, and methods that automatically generate a new pacing plan for a digital content distribution campaign in response to a detected service error to avoid inefficient utilization of resources (e.g., bid spiking). For instance, the systems disclosed herein can monitor actual allocated budget and automatically detect when a service error causes a digital content distribution campaign to deviate from the pacing plan. In response, the disclosed systems can generate a new pacing plan based on the original pacing plan and the actual allocated budget. In particular, one or more embodiments of the disclosed systems can generate a new pacing plan that enables the digital content distribution campaign to efficiently use the remaining resources in the time remaining to implement the digital content distribution campaign.

To illustrate, in one or more embodiments, the disclosed systems generate an original pacing plan for a digital content distribution campaign. For instance, in one or more embodiments, the original pacing plan includes a target budget that is allocated over time (i.e., a targeted budget allocation) together with a lower band and/or an upper band for setting bid values (e.g., a lower band corresponding to a max bid and an upper band corresponding to a minimum bid). The disclosed systems can utilize the pacing plan at an online automated auction forum to set bid values and win impression opportunities to provide targeted digital content to client devices.

In addition, the disclosed systems can monitor actual allocated budget of the content distribution campaign and automatically detect that a service error has occurred, causing the digital content distribution campaign to deviate from the targeted budget allocation. In response to detecting the service error, the disclosed systems can generate a new pacing plan. Specifically, the disclosed systems can generate a new pacing plan that includes a new targeted budget allocation, a new lower band, and/or a new upper band based on the original pacing plan and the actual allocated budget at the time of the service error. To illustrate, in one or more embodiments, the disclosed systems generate a new pacing plan with a new lower bound set at the allocated budget at the time of the service error, which causes increased bids for a short period of time, but prevents unnecessary bid spiking. For example, the systems disclosed herein can create a bid for the online automated auction forum for the digital content distribution campaign based on the actual allocated budget and the new lower band.

Additional features and advantages of the present application will be set forth in the description which follows, and in part will be obvious from the description, or may be learned by the practice of such example embodiments.

BRIEF DESCRIPTION OF THE DRAWINGS

To better describe the manner in which the systems and methods obtain the advantages and features of the disclosed embodiments, a number of example embodiments are described in connection with accompanying drawings. The following paragraphs briefly describe those figures.

DETAILED DESCRIPTION

Figure 1B:
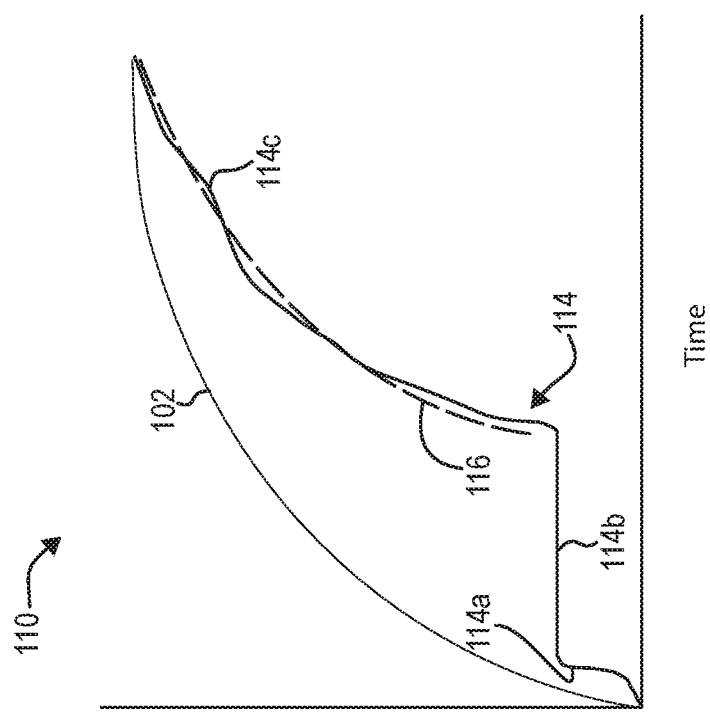
FIG. 1B illustrates modifying a pacing plan after a service error to increase efficiency in accordance with one or more embodiments disclosed herein.

One or more embodiments disclosed herein include a digital pacing modification system that automatically generates a new pacing plan for a digital content distribution campaign in response to a service error to avoid inefficient utilization of resources (e.g., bid spiking). In particular, the digital pacing modification system can create an original pacing plan for a digital content distribution campaign, execute the digital content distribution campaign according to the original pacing plan, and detect when the digital content distribution campaign deviates from the original pacing plan. Based on detecting that the digital content distribution campaign has deviated from the original pacing plan, the digital pacing modification system can automatically generate a new pacing plan to ensure that the digital content distribution campaign efficiently utilizes the remaining resources allocated to the digital content distribution campaign.

To illustrate, in one or more embodiments, the digital pacing modification system generates a first pacing plan for a digital content distribution campaign executed via an online forum. For instance, in one or more embodiments, the first pacing plan includes a target budget that is allocated over the duration of the digital content distribution campaign (i.e., a targeted budget allocation). Moreover, in one or more embodiments, the first placing includes a lower band and/or an upper band (e.g., a lower band for setting max bid values and an upper band for setting minimum bid values at the online automated auction forum). In addition, the digital pacing modification system can automatically detect a service error corresponding to an actual allocated budget of the digital content distribution campaign (i.e., the current amount of allocated resources that has been spent up to a given time). In response to detecting the service error, the digital pacing modification system can generate a second pacing plan that includes a second targeted budget allocation, a second lower band, and a second upper band based on the first pacing plan and the actual allocated budget. Further, the digital pacing modification system can create a bid for the online automated auction forum for the digital content distribution campaign based on the actual allocated budget and the second lower band corresponding to the second pacing plan.

As mentioned previously, in one or more embodiments, the digital pacing modification system detects a service error in a digital content distribution campaign. For example, in one or more embodiments, the digital pacing modification system automatically detects that a service error has occurred for the digital content distribution campaign by comparing the actual allocated budget of the digital content distribution campaign at a given time to the target budget allocation of the pacing plan for the same time. For instance, the digital pacing modification system can determine that the actual allocated budget is below a service threshold relative to the target budget allocation.

As mentioned above, in response to detecting a service error, the digital pacing modification system can generate a new pacing plan. In particular, the digital pacing modification system can generate a new pacing plan that efficiently increases bids at an automated online auction forum while avoiding a bidding spike caused by re-aligning with an original pacing plane. For example, in some embodiments, the digital pacing modification system can generate the new pacing plan by generating a new lower band based on the actual allocated budget. Indeed, in one or more embodiments, the digital pacing modification system can generate a new lower band to start at (or intersect with) the actual allocated budget (e.g., the actual allocated budget at the time of the service error).

In addition, the digital pacing modification system can also generate a new target budget allocation. For example, the digital pacing modification system can generate a new target budget allocation based on the actual allocated budget (and/or the new lower band). For instance, the digital pacing modification system can generate a new target budget allocation that exceeds a lower bound by a lower threshold value. In this manner, the digital pacing modification system can encourage efficient increased bids after a service error and enable the digital content distribution campaign to quickly, efficiently, and smoothly realign to the new target budget allocation.

For instance, in one or more embodiments, the digital pacing modification system creates a maximum bid (e.g., the maximum bid value or price set by a publisher) for the digital content distribution campaign when the actual allocated budget is at the lower band of a pacing plan. In addition, as the actual allocated budget moves away from the lower band, the digital pacing modification system can decrease the bid amount. By setting a lower band based on the actual allocated budget, the digital pacing modification system can employ increased bids to smoothly align to the new pacing plan rather than bidding maximum bids until the actual allocated budget aligns with the original pacing plan (which can cause bidding spikes and quickly spend the majority of the resources allocated to the digital content distribution campaign).

In one or more embodiments, the digital pacing modification system generates the new pacing plan based on the original pacing plan. Indeed, in some circumstances, the original pacing plan reflects characteristics of a target audience (e.g., a pacing plan may be shaped based on models estimating target audience availability via a particular medium over time). The parallel model processing system can maintain these characteristics in generating a new pacing plan. For example, in one or more embodiments, the digital pacing modification system applies a transformation (e.g., a linear transformation) to an original targeted budget allocation to generate a new targeted budget allocation. In this manner, the digital pacing modification system can generate a new pacing plan that finishes at the same final target allocation as the original pacing plan and efficiently incorporates the same dataset and/or user characteristics (e.g., the shape) of the original pacing plan.

In some embodiments, the digital pacing modification system can modify a pacing plan multiple times through the duration of a digital content distribution campaign. For example, the digital pacing modification system may detect multiple service errors, and for each service error, generate a new pacing plan. In each case, the digital pacing modification system can ensure that the latest generated pacing plan approximately matches the shape of one or more previous pacing plans and satisfies a final target allocation.

The digital pacing modification system provides numerous advantages and benefits over conventional advertising systems. Indeed, as discussed above, service errors and other issues can stall digital content distribution campaigns, leading to significant deviation from an original pacing plan. To remedy the shortfall resulting from these service error, conventional systems generally maximize bid values until a campaign realigns with the pacing plan, resulting in individual and system-wide bidding spikes. In contrast, the digital pacing modification system generates a new pacing plan upon detecting a service error and realigns the digital content distribution campaign to the new pacing plan.

By realigning the digital content distribution campaign to a new pacing plan, the digital pacing modification system can prevent inefficient bidding spikes while also causing the digital content distribution campaign to smoothly and efficiently finish at the final allocation target. Indeed, the new pacing plan enables the digital pacing modification system to generate some bids at an increased bid value to help jump start the digital content distribution campaign after the service error, but as the actual allocated budget for the digital content distribution campaign approaches the new targeted budget allocation of the new pacing plan, the digital pacing modification system begins to reduce the bid value for each content item that is to be placed. Because the bid values are generally less than conventional systems, the digital pacing modification system is able to place more content items at reduced prices for publishers. Accordingly, the digital pacing modification system enables the digital content distribution campaign to more efficiently use and maximize the remaining resources (e.g., budget) allocated to the digital content distribution campaign.

In addition, because the digital pacing modification system results in a more gradual, smooth transition after a service error, the digital pacing modification system also improves the efficiency of computing resources implementing the digital pacing modification system. Indeed, depending on the nature of a service error, thousands of publishers may have thousands of corresponding digital content distribution campaigns that have deviated significantly from thousands of pacing plans. Accordingly, after a service error, conventional systems can be bombarded with maximum bids from thousands of digital content distribution campaigns for a prolonged period of time (i.e., until all of the digital content distribution campaigns have realigned with an original pacing plan). Furthermore, conventional systems often see a significant reduction in bids after the initial bid spike. In contrast, the digital pacing modification system can significantly reduce the initial spike in number and value of bids after a service error and avoid a precipitous drop in number and value thereafter. Indeed, by generating a new pacing plan that more gradually targets a final target allocation, the digital pacing modification system can more efficiently utilize computing resources and avoid overtaxing or wasting available processing power after a service error.

The term "service error," as used herein refers to under delivering content items as projected by a pacing plan. For instance, the term "service error" includes a fault, code, act, flaw, or process that results in a reduced number of winning bids (e.g., allocation of budget on winning bids and subsequent impressions to client devices) relative to a pacing plan. In particular, the term "service error" includes a communication fault, coding error, system outage, or another issue that prevents the digital pacing modification system from placing content items to particular client devices (or receiving reports back that content items have been placed) in accordance with a pacing plan. In some embodiments, a service error is detected when the actual allocated budget is below or at a service threshold, which can include the lower band of a pacing plan, an allocated budget amount below the pacing plan (e.g., $5 or 30%), or a number of under-placed content items (e.g., 50 content items).

As used herein, the term "content item" refers to digital content or data that is transmitted over a communication network (e.g., the Internet or an intranet). In particular, a "content item" includes text, images, audio, and audiovisual content. For instance, a content item can include digital content that promotes a product, service, or another offering by an entity (e.g., a publisher, such as an advertiser). In one example, a web page displays one or more content items to a user viewing the web page. In another example, a user views a content item in connection with viewing other audiovisual content. For example, in one or more embodiments, a content item is offered as part of a social networking news feed or as a digital advertisement within a messaging application as part of a digital content distribution campaign.

Moreover, as used herein, the term "digital content distribution campaign" refers to a series of actions, rules, and/or processes for disseminating one or more content items. In particular, a digital content distribution campaign includes one or more content items (e.g., advertisements) and one or more campaign parameters for disseminating the one or more content items. To illustrate, a digital content distribution campaign includes a content item together with campaign parameters for bidding on impression opportunities, sending content items to client devices, or targeting particular client devices and/or users.

As used herein, the term "campaign parameters" includes factors, rules, or criteria that define the conditions or operation of a digital content distribution campaign. For example, campaign parameters can include (but are not limited to) campaign objectives (e.g., traffic, exposure, impressions, clicks, downloads, lead generations, shares, app installs, video views, conversions, or sales), the costs the publisher (e.g., advertiser) is willing to spend on a digital content distribution campaign (e.g., daily budget and lifetime budgets), bidding preferences (e.g., maximum bid values, minimum bid values, or bid variations), targeting parameters (e.g., characteristics of clients, devices, locations, or media to target with a content item), the duration and schedule of the campaign, and/or the reach of the campaign.

In one or more embodiments, the digital pacing modification system utilizes campaign parameters that include a pacing plan. As used herein, the term "pacing plan" refers to an allocation schedule for a digital content distribution campaign for a specified time duration. For instance, a pacing plan can include a schedule for allocation resources (e.g., money, time, number of advertisements) over a specified time period. In particular, a "pacing plan" includes values (e.g., bid values) or a number of content items over time associated with a digital content distribution campaign. For example, a pacing plan can include a schedule of allocated resources to utilize a projected amount of money, to serve a number content items, to obtain a number of conversions, or to receive an amount of revenue for a digital content distribution campaign. The digital pacing modification system can use a pacing plan for a digital content distribution campaign to determine a bid value for the digital content distribution campaign at an online auction forum that bids for impression opportunities. Further, the duration of a pacing plan can span from a start time to a final time, and can last minutes, hours, days, or weeks.

As mentioned above, a pacing plan can include a targeted budget allocation as well as an upper band and a lower band. A "targeted budget allocation," as used herein, is a part of a pacing pan that defines a desired (or estimated) amount of funds to spend over time. In particular, a target budget allocation includes a distribution that models a desired, anticipated, or preferred amount of budget to utilize over time. In one or more embodiments, a target budget allocation includes a distribution line or curve that reflects one or more viewer characteristics over time. For example, in one or more embodiments, the path (and slope) of the targeted budget allocation can be based as user activity levels (e.g., user engagement) at different times of the day. In some embodiments, the targeted budget allocation is user-defined, such as by a publisher (e.g., advertiser). Moreover, in one or more embodiments, the targeted budget allocation is a cumulative measure that begins at zero and ends at a final allocated target (e.g., the budget amount that a publisher wishes to pay for or spend as part of the digital content distribution campaign).

As used here an "upper band" and a "lower band," refers to tolerances above and below the targeted budget allocation, respectively. In particular, an upper band and lower band of a pacing plan include tolerances above and below a targeted budget allocation for setting bid value. For example, the digital pacing modification system can utilize an upper band and lower to set bid values (e.g., decrease and increase bid values) to keep the digital content distribution campaign at the targeted budget allocation and end at the final allocation target. To illustrate, in one or more embodiments, the digital pacing modification system compares an actual allocated budget with an upper band or lower band and sets a bid based on the comparison. For example, if the actual allocated budget is at (or nearer) the upper band, in one or more embodiments, the digital pacing modification system provides a reduced bid (e.g., a minimum bid). Similarly, if the actual allocated budget is at (or nearer) the lower band, in one or more embodiments, the digital pacing modification system provides an elevated bid (e.g., a maximum bid).

In one or more embodiments, the upper band and/or lower band are separated from the targeted budget allocation by a "tolerance distance." For instance, a tolerance distance can be a percentage or amount between the targeted budget allocation and the upper band and/or lower band (e.g., a "lower band tolerance distance"). In some embodiments, the tolerance distance is fixed, in some embodiments, the tolerance distance varies over time.

As just mentioned, in connection with a pacing plan, the digital pacing modification system monitors the actual allocated budget (e.g., compares the allocated budget with a lower band and/or upper band to determine a bid value). As used herein, the term "actual allocated budget" refers to the amount of resources already utilized for a digital content distribution campaign. In particular, the term actual allocated budget includes an amount of budget already spent for a digital content distribution campaign. For example, "actual allocated budget" includes the monetary amount attributable to, associated with, debited from, invoiced to, billed to, or collected from a publisher for placement of content items from a digital content distribution campaign. In another example, the actual allocated budget refers to the number of content items currently placed or that have caused a trigger event for billing. Depending on the digital content distribution campaign and/or auction bid, actual allocated budget can be based on impressions, views, clicks, "likes," shares, downloads, or other triggering events.

The term "impression opportunities," as used herein, refers to an available opportunity, slot, or space for providing content items (e.g., advertisement). In particular, an impression opportunity includes an available space on a communication network where a content item could be served or presented. An impression opportunity can include a variety of opportunities in a variety of different digital media, such as, a webpage or a networking system (e.g., a social networking system, a messaging system). Similarly, the term "impression" refers to digital content retrieved from a source (e.g., via a remote server) to be served for a particular purpose (e.g., served in a content item slot or space to a client device). In particular, an impression corresponds to a countable event for when a content item is retrieved and served (e.g., regardless of whether a user views or otherwise interacts with the content item).

As mentioned above, an online automated auction server or system may auction off impression opportunities to digital content distribution campaigns that correspond to a winning bid. As used herein, the term "winning bid" refers to a bid selected by an online automated auction. As outlined below, the digital pacing modification system can utilize a variety of parameters for determining a winning bid (e.g., highest bid value, relevance, and/or appropriateness of the advertisement to a particular user).

As used herein, the term "new pacing plan" refers to an additional, different, updated, or modified pacing plan. In particular, a new pacing plan includes a separate pacing plan based on an original pacing plan or an updated version of the original pacing plan itself. A new pacing plan can include a new targeted budget allocation, a new lower band, and/or a new upper band. In addition, a new pacing plan can run from an intermediary time to a finish time. Moreover, a new pacing plan can finish at the same final allocation target as an original pacing plan.

Figure 1A:
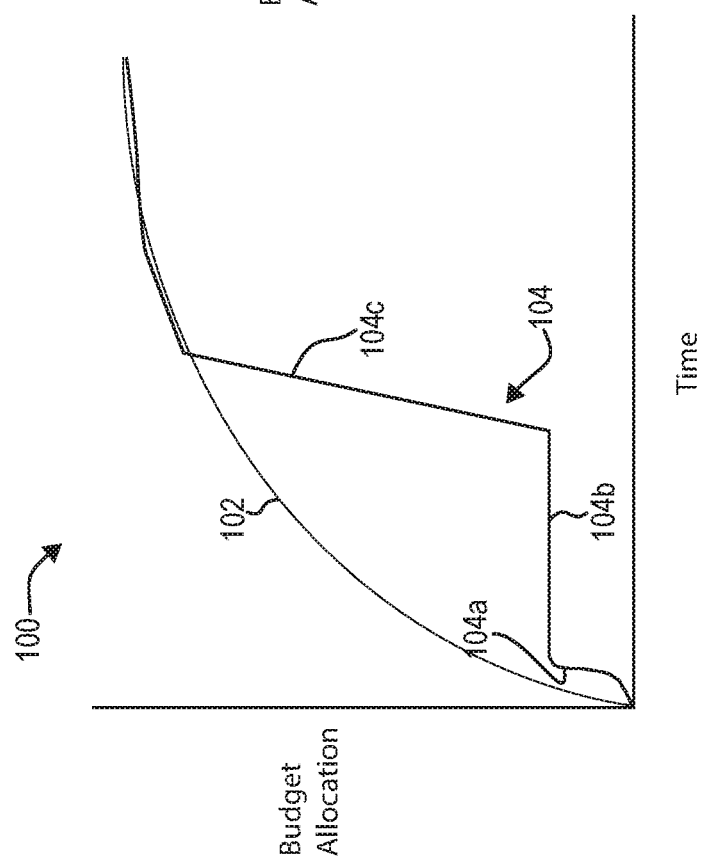
FIG. 1A illustrates a conventional system inefficiently reacting to a service error within a digital content distribution campaign.

As mentioned above, the digital pacing modification system provides a number of advantages and benefits over conventional systems. Additional advantages and benefits will become evident as illustrative embodiments are described in connection with the figures. To illustrate, FIGS. 1A and 1B compare conventional systems with embodiments of the digital pacing modification system responding to a service error within a digital content distribution campaign. In particular, FIG. 1A illustrates conventional systems, while FIG. 1B illustrates how embodiments of the digital pacing modification system respond to a service error.

As shown in FIGS. 1A and 1B, a digital content distribution campaign has a targeted budget allocation 102 for placing content items to client devices. In particular, the targeted budget allocation 102 indicates the budget amount that is allocated (i.e., the y-axis) over time (i.e., the x-axis) for the digital content distribution campaign. While the targeted budget allocation 102 is shown as a particular curve for purposes of explanation, other lines or curves are possible.

As shown, FIG. 1A includes a first graph 100 of an actual allocated budget 104. For explanation purposes, multiple segments of the actual allocated budget 104 are labeled. The first segment 104a of the actual allocated budget 104 shows the actual allocated budget 104 generally aligning with the targeted budget allocation 102. When the actual allocated budget 104 is below the targeted budget allocation 102 at a given time, the bid value for the digital content distribution campaign is increased. Similarly, when the actual allocated budget 104 is above the targeted budget allocation at a given time, the bid value is decreased.

In the first graph 100, a service error occurs during the time represented by the second segment 104b of the actual allocated budget 104. For example, a communication fault, isolated or widespread system outage, coding bug, reporting error, or another type of service error causes content items not to be placed and/or displayed at client devices, or successfully reported back to the digital pacing modification system. As illustrated, the second segment 104b of the actual allocated budget 104 does not increase in budget allocation for the duration of the service error. In some cases, a service error reduces the number of placed content items rather than prevents every content item from being placed on client devices (e.g., the actual allocated budget 104 still grows, but much slower than expected).

When the service error resolves, the actual allocated budget 104 is off course with the targeted budget allocation 102. To remedy this issue, conventional systems set the bid value for the digital content distribution campaign to the maximum bid value. As shown in the third segment 104c of the actual allocated budget 104, the actual allocated budget 104 spikes up toward the targeted budget allocation 102. Further, conventional systems use roughly half of the allocated budget during the bidding spike. Indeed, by bidding the maximum bid value, conventional systems can inefficiently spend a large portion of a digital content distribution campaign's budget and other resources in a very short time in an attempt to realign the actual allocated budget 104 with the targeted budget allocation 102. Thus, while the actual allocated budget 104 eventually catches up to the targeted budget allocation 102, it does so at the expense of winning fewer, and more expensive, impression opportunities.

In contrast, FIG. 1B shows a second graph 110 that illustrates the digital pacing modification system managing the actual allocated budget 114 to efficiently overcome the same service error. Like the conventional systems shown in FIG. 1B, the first segment 114a of the actual allocated budget 114 progresses on course before a service error occurs, which is illustrated in connection with the second portion 114b of the actual allocated budget 114. However, rather than causing a bidding spike, the digital pacing modification system generates a new pacing plan with a new targeted budget allocation 116. The new targeted budget allocation 116 enables the digital pacing modification system to efficiently end the digital content distribution campaign on target given the remaining budget allocation.

To illustrate, the digital pacing modification system generates the new targeted budget allocation 116 above the actual allocated budget 114 at the time the service error is resolved (i.e., a starting point of the new targeted budget allocation 116 is above the actual allocated budget). Accordingly, the third segment 114c of the targeted budget allocation shows the digital pacing modification system applying an increased bid (e.g., a maximum bid) for a short period of time before decreasing the bid value for the digital content distribution campaign. Further, the third segment 114c of the targeted budget allocation shows the actual allocated budget 114 ending at the final allocation target corresponding to the original targeted budget allocation 102 while efficiently serving an increased number of content items given the remaining budget allocation.

Figure 2:
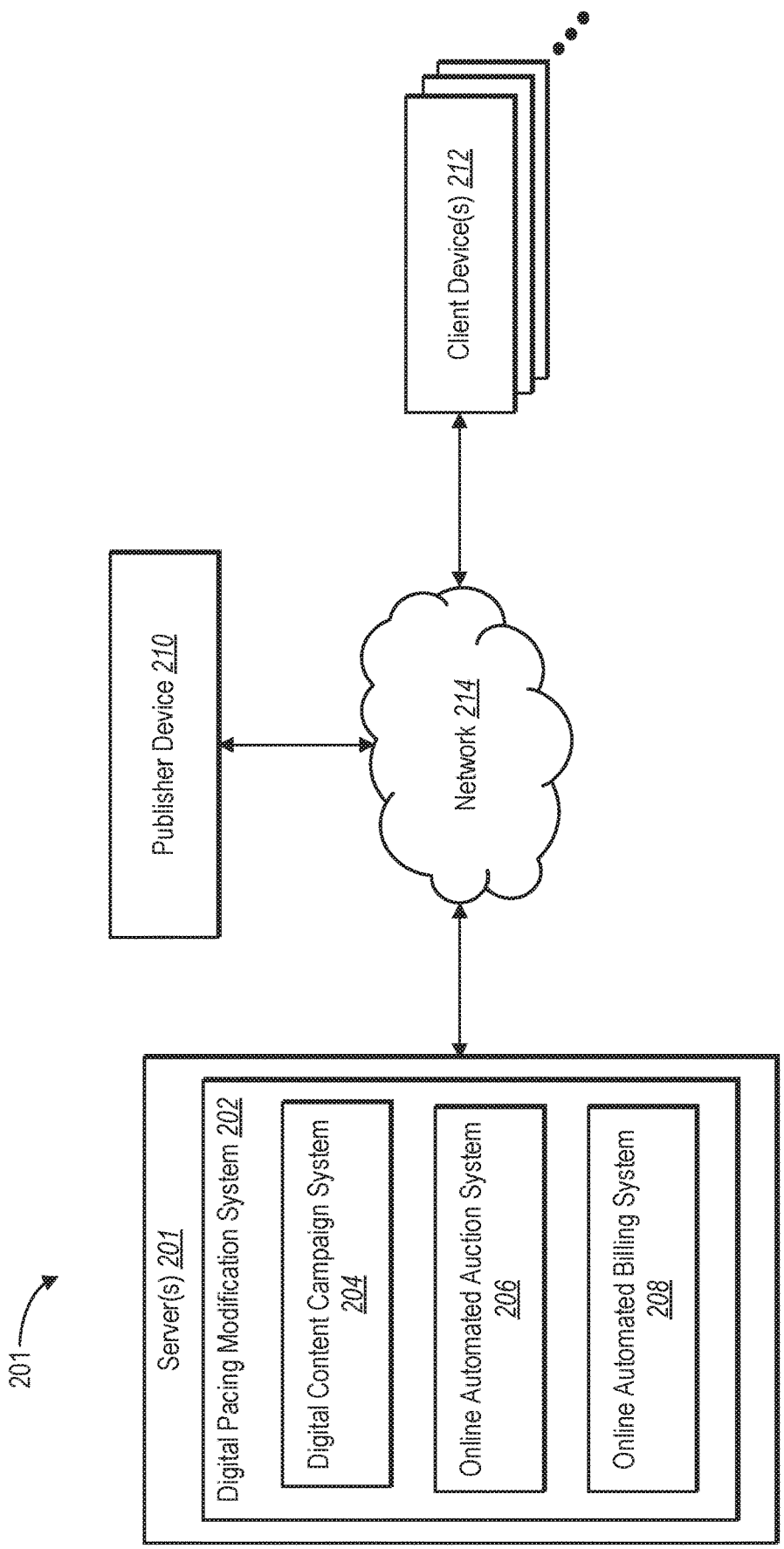
FIG. 2 illustrates a schematic diagram of an exemplary environment in which a digital pacing modification system may be implemented in accordance with one or more embodiments disclosed herein.

As mentioned above, in one or more embodiments, the digital pacing modification system is implemented within an environment that includes various computing devices and components. FIG. 2 illustrates a schematic diagram of an environment 200 in which an exemplary digital pacing modification system 202 may be implemented in accordance with one or more embodiments. As shown, the environment 200 includes server(s) 201 implementing the digital pacing modification system 202 in conjunction with a digital content campaign system 204, an online content auction system 206, and an online automated billing system 208.

As shown in FIG. 2, the environment 200 may include the server(s) 201. The server(s) 201 may generate, store, receive, and transmit any type of data. For example, the server(s) 201 may transmit data to a client device, such as one of the client device(s) 212. In one example embodiment, the server(s) 201 comprise a content server. The server(s) 201 can also comprise a communication server or a web-hosting server. Additional details regarding the server(s) 201 are discussed below with respect to FIG. 8.

As shown, the server(s) 201 can implement (e.g., host) the digital pacing modification system 202, the digital content campaign system 204, the online content auction system 206, and the online automated billing system 208. As discussed above the digital pacing modification system 202 can detect a service error to a digital content distribution campaign and modify a pacing plan to efficiently guide the digital content distribution campaign to the final allocated target.

As an overview, the digital content campaign system 204 manages digital content distribution campaigns as well as serves content items to client devices. The online content auction system 206 facilitates online auctions between different digital content distribution campaigns. Moreover, the online automated billing system 208 collects actual revenue attributable to (e.g., billed to or able to be billed to) a publisher (e.g., an advertiser) and reports billing information back to the digital content campaign system 204. Additional details regarding each of these systems are described below.

While FIG. 2 shows the digital pacing modification system 202, the digital content campaign system 204, the online content auction system 206, and the online automated billing system 208 located on the server(s) 201, each of these systems can be implemented on the same or different servers. For example, in one or more embodiments, the digital pacing modification system 202 is implemented via a first set of servers, the online content auction system 206 is implemented via a second set of servers, and/or the online automated billing system 208 is implemented via a third set of servers.

Moreover, although FIG. 2 illustrates the digital pacing modification system 202 implementing the digital content campaign system 204, the online content auction system 206, and the online automated billing system 208, in some embodiments, the digital pacing modification system 202 can be implemented (in whole or in part) within one or more of the digital content campaign system 204, the online content auction system 206, and the online automated billing system 208. For example, in one or more embodiments, the digital pacing modification system 202 is implemented (e.g., hosted) as part of the digital content campaign system 204.

As shown in FIG. 2, the environment 200 also includes a publisher device 210 and client device(s) 212. The publisher device 210 and/or the client device(s) 212 may comprise any computing device. For instance, in various embodiments, one or more of the publisher device 210 and/or the client device(s) 212 comprise one or more computing devices described below in relation to FIG. 8. In addition, while FIG. 2 shows a single publisher device 210, the environment 200 can include any number of publisher devices.

The components of the environment 200 (e.g., the server(s) 201, publisher device 210, the client device(s) 212, the digital content campaign system 204, the digital pacing modification system 202, the online content auction system 206, and the online automated billing system 208) can communicate via the network 214. For example, the publisher device 210 can provide campaign parameters for a digital content distribution campaign to the digital content campaign system 204. In another example, the client device(s) 212 can receive content items from the digital content campaign system 204. The network 214 may be any suitable network over which the computing devices can communicate. Example networks are discussed in more detail below with regard to FIG. 8.

As mentioned above, in one or more embodiments, the digital pacing modification system 202 can detect a service error to a digital content distribution campaign and generate a new pacing plan that enables the digital content distribution campaign to efficiently finish the digital content distribution campaign on target. By way of example, a publisher wanting to promote a product or service indicates (e.g., via the publisher device 210) one or more content items (e.g., online advertisements) to include in a digital content distribution campaign. Further, the publisher specifies additional campaign parameters, such as a target audience, an allocated budget, a bidding amount (e.g., maximum bid values), and/or a pacing plan.

The digital pacing modification system 202 (e.g., via the digital content campaign system 204), in response, generates a digital content distribution campaign that includes the pacing plan (in some embodiments, the digital pacing modification system 202 also generates a pacing plan, such as where a publisher does not provide one). For instance, the pacing plan includes a targeted budget allocation that identifies, given the campaign parameters, the timing and quantity of placing content items for the digital content distribution campaign.

The digital content campaign system 204 provides campaign parameters (including the pacing plan) to the online content auction system 206. The online content auction system 206 detects impression opportunities via client devices (e.g., the client device(s) 212) interacting with various digital media platforms (e.g., websites, social networking newsfeeds, or messaging applications). Moreover, to determine which digital content distribution campaign will populate an impression opportunity, the online content auction system 206 hosts an online automated auction (e.g., according to the pacing plan and campaign parameters provided by the publisher device 210). The digital content distribution campaign with the winning bid is used to populate (e.g., via the digital content campaign system 204) the available impression opportunities. In response, the online content auction system 206 can bill (e.g., attribute revenue) from the advertiser to the digital pacing modification system 202 for serving or placing the digital advertisement.

During the digital content distribution campaign, the digital pacing modification system 202 (via the digital content campaign system 204) can monitor the status of the digital content distribution campaign. In one or more embodiments, the digital pacing modification system 202 detects a service error that has caused the digital content distribution campaign to deviate from the pacing plan. For example, in some embodiments, the online content auction system 206 reports an actual allocated budget that has remained unchanged for a predetermined amount of time. In another example, the online automated billing system 208 reports that the actual allocated budget is below a service threshold corresponding to the targeted budget allocation at a given time.

Based on detecting the service error, the digital pacing modification system 202 can generate a new pacing plan that includes at least a new lower band. In particular, in various embodiments, the digital pacing modification system 202 generates a new lower band that intersects with the actual allocated budget at the time the service error is detected. Further, the digital pacing modification system 202 generates the rest of the new pacing plan based on the new lower band and the original pacing plan.

Upon generating the new pacing plan, the digital pacing modification system 202 (via the digital content campaign system 204) can provide updated campaign parameters to the online content auction system 206 that reflect the new pacing plan. In response, the online content auction system 206 sets bid values for the digital content distribution campaign based on the new pacing plan. For instance, the online content auction system 206 sets bids for the digital content distribution campaign to the maximum bid value (and provides content items to the client device(s) 212) until the actual allocated budget moves away from the new lower band and towards the new targeted budget allocation, at which point, the online content auction system 206 decreases the bid values away from the maximum bid value.

Figure 3A:
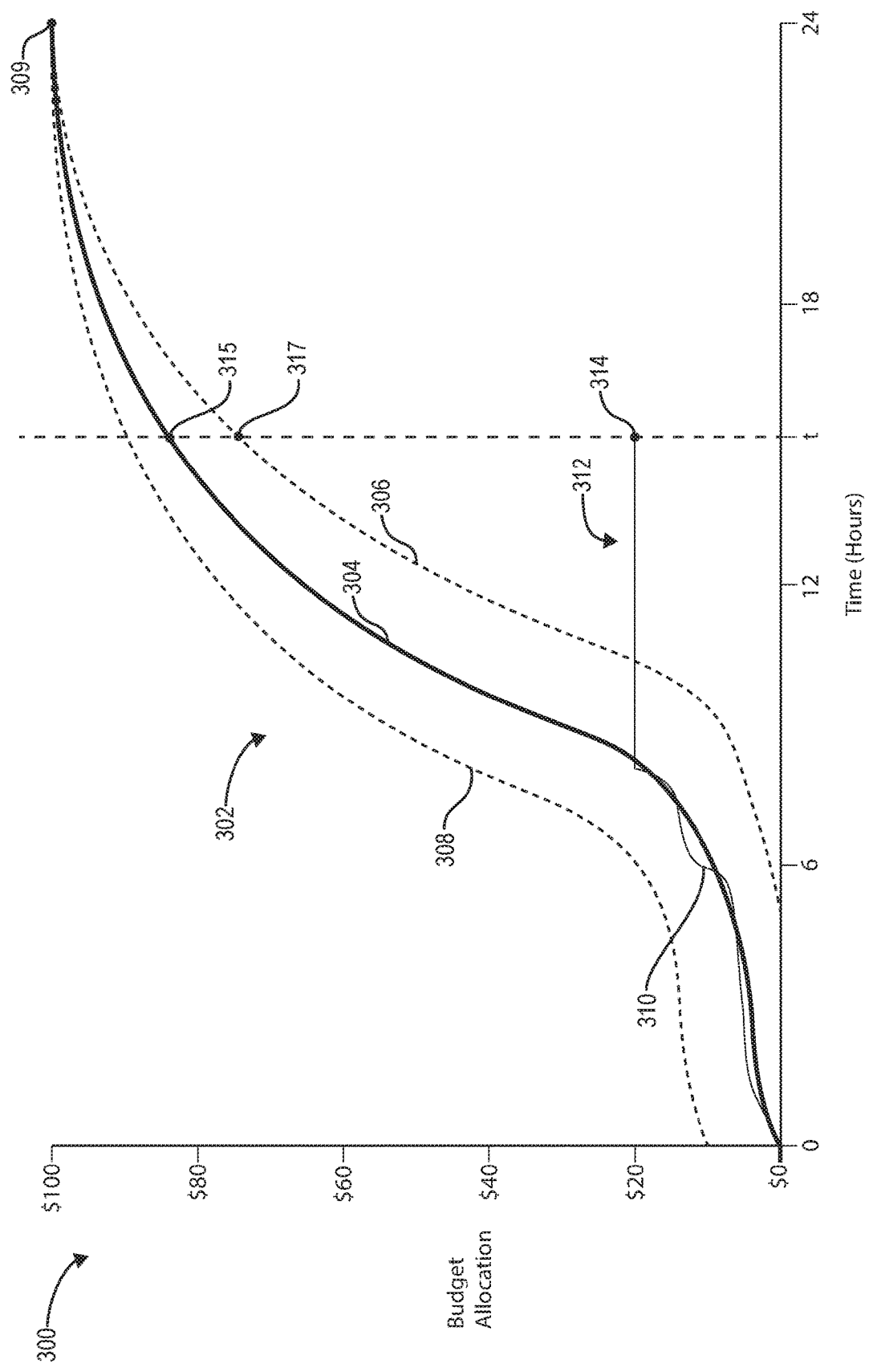
FIGS. 3A-3D illustrate a series of graphs that show identifying and modifying a pacing plan for a digital content distribution campaign in accordance with one or more embodiments disclosed herein.

Turning now to FIGS. 3A-3D, additional detail is provided regarding the digital pacing modification system 202 detecting a service error and modifying a pacing plan based on the detected service error. In particular, FIGS. 3A-3D illustrate a series of graphs that show the digital pacing modification system 202 identifying a service error and modifying a pacing plan in accordance with one or more embodiments. As shown in FIG. 3A, the graph 300 includes a pacing plan 302 generated by the digital pacing modification system 202. The pacing plan 302 shows the projected budget allocation (x-axis) over time (y-axis) for a digital content distribution campaign as well as parameters (i.e., lower bound and upper bound) for bidding based on actual budget allocation. Specifically, as shown, the pacing plan 302 includes a targeted budget allocation 304, a lower band 306 and an upper band 308. Moreover, as illustrated the pacing plan 302 spans from a start time (i.e., 0 hours) to a final time (i.e., 24 hours). In addition, the pacing plan 302 shows a projected budget allocation that spans from a starting allocation (i.e., $0 at hour 0) to a final allocation target 309 (i.e., $100 at 24 hours).

The budget allocation and time frame shown in the graph 300 correspond to a digital content distribution campaign for a publisher. That said, although the graph 300 includes specific enumerated values for purposes of explanation, a digital content distribution campaign can correspond to any budget allocation and time frame. For example, the digital content distribution campaign can be a 3-hour campaign that allocates a budget of $10. In another example, the dependent claim can be a 1-month campaign with an allocated budget of $100,000.

As mentioned above, in one or more embodiments, the digital pacing modification system 202 generates the pacing plan 302. For example, the digital pacing modification system 202 communicates with a publisher (e.g., via a publisher device) to obtain campaign parameters for a digital content distribution campaign that includes a campaign objective, the costs the advertiser is willing to spend on the campaign, bidding preferences, targeting parameters, the duration and schedule of the campaign, and/or the reach of the campaign. For instance, as shown in FIG. 3A, based on input from a publisher, the digital pacing modification system 202 generates a pacing plan 302 that has an allocated budget of $100 for a 24-hour period.

Additionally, the digital pacing modification system 202 can also generate the pacing plan 302 based on user characteristics. In one or more embodiments, the digital pacing modification system 202 analyzes user characteristics of users in a target audience for the digital content distribution campaign when generating the pacing plan 302. For example, if the target audience includes users on a social networking system with particular demographics and interests, the digital pacing modification system 202 identifies historical data (e.g., a histogram of past user activity broken down by hour) to determine when those users will be active on the social networking system. The digital pacing modification system 202 can then generate the pacing plan 302 to maximize delivery of content items when users are most active.

To illustrate, if the pacing plan 302 in FIG. 3A starts at midnight (i.e., 0 hours) and ends at midnight the next day (i.e., 24 hours) and targets a single time zone, then the pacing plan 302 projects placing the most content items between 8 AM and 6 PM, as indicated by the slope of the pacing plan 302 being steepest at those times. Further, the pacing plan 302 projects placing fewer content items during the first few hours and the last few hours of the day.

While FIGS. 3A-3D illustrate a simplified pacing plan, the principles, techniques, and methods described herein apply to more complex pacing plans and digital content distribution campaigns. For example, many digital content distribution campaigns are national or international campaigns that span multiple target audiences and time zones, resulting in complex pacing plans. In various embodiments, the digital pacing modification system 202 can create multiple pacing plans for a complex digital content distribution campaign. For instance, the digital pacing modification system generates a pacing plan for each country and/or time zone targeted by a digital content distribution campaign. By employing multiple pacing plans, the digital pacing modification system 202 can quickly identify and remedy a service error affecting a particular pacing plan (or multiple pacing plans).

In some embodiments, the pacing plan 302 is based on user-input. For example, a publisher specifies the targeted budget allocation and/or bands of a pacing plan. In another example, the publisher specifies a number of intervals and a budget allocation for each interval of the digital content distribution campaign. Additionally, the digital pacing modification system 202 can generate a pacing plan based on a combination of historical data, user characteristics, and user-input.

As mentioned above, the digital pacing modification system 202 uses the campaign parameters and the pacing plan 302 to generate bids for the digital content distribution campaign. For example, the digital pacing modification system 202 creates bids to win impression opportunities at an online automated auction forum in competition with other digital content distribution campaigns. In particular, the digital pacing modification system 202 uses the pacing plan 302 to determine whether to increase or decrease the bid value of a bid for the digital content distribution campaign, based on the current performance of the digital content distribution campaign.

To illustrate, the graph 300 shows an actual allocated budget 310. The actual allocated budget indicates the actual amount of budget that a publisher has spent (e.g., owes to the digital pacing modification system 202) at any given time during the campaign. As shown, at the start of the digital content distribution campaign, the actual allocated budget 310 increases above and decreases below the targeted budget allocation 304 at various times until the service error 312 occurs around hour 8.

As recently mentioned above, the actual allocated budget 310 can rise or fall based on the digital pacing modification system 202 adjusting bid values for the digital content distribution campaign. For example, as the actual allocated budget 310 approaches the upper band 308, the digital pacing modification system 202 can lower the bid value to reduce the number of winning bids for the digital content distribution campaign. When the actual allocated budget 310 intersects (e.g., touches or crosses) the upper band 308, the digital pacing modification system 202 sets the bid value to a minimum bid (e.g., $0.00 or some other value) to prevent additional winning bids (i.e., the actual allocated budget 310 remains flat). Similarly, when the actual allocated budget 310 approaches the lower band, the digital pacing modification system 202 increases the bid value (i.e., to increase the likelihood of obtaining additional winning bids). When the actual allocated budget 310 intersects with the lower band, the digital pacing modification system 202 sets the bid value to the maximum bid value (e.g., a maximum bid value set by the publisher) to enable the actual allocated budget 310 to trend upwards.

The amount that the digital pacing modification system 202 adjusts the bid value for a digital content distribution campaign can be based on the location of the actual allocated budget 310 relative to the pacing plan 302 (e.g., relative to the tolerances reflected in the upper band 308 and the lower band 306). To illustrate, in one or more embodiments, the digital pacing modification system 202 uses a linear mapping to determine the amount to increase or decrease a bid based on the actual allocated budget 310 relative the lower band 306 and the upper band 308. For example, the digital pacing modification system 202 sets the lower band 306 at the maximum bid value and the upper band 308 at zero and linearly adjusts the bid value accordingly. For instance, if the maximum bid value is $0.10 and the actual allocated budget 310 at a given time is 70% from the upper band 308 (i.e., 30% away from the lower band 306), then the digital pacing modification system 202 bids 70% of the maximum bid or $0.07.

In alternative embodiments, the digital pacing modification system 202 can adjust bid values using other mapping functions. For example, if the targeted budget allocation 304 represents the average bid value (e.g., often half the maximum bid value), the digital pacing modification system 202 can exponentially increase the bid value (up to the maximum bid value) as the actual allocated budget 310 approaches the lower band 306 and/or logarithmically decrease the bid value (down to zero) as the actual allocated budget 310 approaches the upper band 308.

Moreover, the distance (e.g., tolerance) between the lower band 306 and upper band 308 to the targeted budget allocation 304 can change over time. As shown, in FIG. 3A, the wider tolerance at the start time (i.e., 0 hours) gradually narrows until the final time (i.e., 24 hours). By narrowing (e.g., tapering) the tolerance of the lower band 306 and the upper band 308, the digital pacing modification system 202 can guide the digital content distribution campaign to finish at the final allocation target 309. In one or more embodiments, the digital pacing modification system 202 linearly narrows the tolerance distances of the lower band 306 (i.e., the lower band tolerance distance) and upper band 308 (i.e., the upper band tolerance distance) over time. For example, the digital pacing modification system 202 reduces the tolerance from 10% at 0-hours to 5% at 12-hours to 0% at 24-hours.

In alternative embodiments, the digital pacing modification system 202 narrows the tolerance distances of the lower band 306 and upper band 308 using other factors. For instance, the digital pacing modification system 202 narrows the tolerance distances based on user activity, for example, the tolerance distance of the lower band 306 and upper band 308 is closer to the targeted budget allocation 304 when user activity is high and the tolerance distances is low when user activity decreases (or vice-versa). In this manner, the digital pacing modification system 202 enforces stricter bid pricing when more users are present. In some embodiments, the digital pacing modification system 202 exponentially or logarithmically narrows (or widens) the tolerance distances of the lower band 306 and upper band 308 over time.

In various embodiments, the digital pacing modification system 202 maintains the same tolerance distances throughout the digital content distribution campaign, without widening or narrowing them (e.g., the lower band tolerance distance and the upper band tolerance distance are parallel with the targeted budget allocation 304). In another instance, the digital pacing modification system 202 maintains the tolerance distances of the lower band 306 and upper band 308 until the last 20% (or another amount) of the digital content distribution campaign remaining, at which point, the digital pacing modification system 202 narrows the tolerance distances to near zero. In some embodiments, the digital pacing modification system 202 narrows the tolerance distances of the lower band 306 and upper band 308 at different rates and/or based on the amount of remaining time.

In addition, the digital pacing modification system 202 can unequally narrow and/or widen the tolerance distances of lower band 306 and the upper band 308. For example, the digital pacing modification system 202 narrows the tolerance distance of the lower band 306 over time while maintaining the tolerance distance of the upper band 308.

Similarly, in one or more embodiments, the digital pacing modification system 202 sets the lower band 306 and the upper band 308 at different tolerance distances when generating the pacing plan 302. For instance, rather than having matching tolerance distances (as shown), the digital pacing modification system 202 sets the tolerance distance for the lower band at or near zero (i.e., along or just below the targeted budget allocation). In this manner, the digital pacing modification system 202 can set the bid value to the average bid value when the actual allocated budget is at the targeted budget allocation 304, but jump the bid value to the maximum bid value if the actual allocated budget 310 ever drops below the targeted budget allocation 304/lower band 306 (unless the drop is the result of a service error, as described below).

In FIG. 3A, the actual allocated budget 310 progresses along the targeted budget allocation 304 over time until a service error 312 occurs. As illustrated, the service error starts around hour 8 and lasts until about hour 15. During the service error 312, the actual allocated budget 310 is flat because content items are not being placed (or not reported back to the online automated billing system). Thus, the budget allocation hovers around $20 between hour 8 and hour 15 rather than following the pacing plan 302 and rising to approximately $85 by hour 15.

A service error 312 can include various types of communication faults, coding errors (e.g., "bugs"), or other service issues. For example, a communication fault blocks the service of content items to a particular region or country. Depending on the size of the service region, a service error may go undetected for long periods of time, even days. To illustrate, a publisher has multiple digital content distribution campaigns with target audiences spanning the globe. If a service error occurs to one of the digital content distribution campaigns that target users in a smaller country, the service error may go unnoticed by the publisher when looking at the multiple digital content distribution campaigns as a whole.

In another example, a digital content distribution campaign targets users of a particular mobile application. Before or during the digital content distribution campaign, an updated version of the application that includes a coding error that causes a service error by preventing placed content items from being displayed on user client devices. Similarly, a programmer may introduce a coding error that prevents content items in a digital content distribution campaign from being placed and/or displayed on client devices. As another example, the digital pacing modification system 202 can successfully display content items for users of a first mobile operating system, but not for a second mobile operating system, which results in a service error to the digital content distribution campaign.

As shown, the service error 312 is reflected by a flat line in the actual allocated budget 310. However, in some cases, the service error 312 still increases, but at a reduced rate. For example, the digital pacing modification system 202 can successfully display content items to users of a first mobile operating system, but a service error prevents the content items from displaying the same content items on a second mobile operating system, then the actual allocated budget 310 would still increase, but at a much slower (e.g., more gradual) rate. In any case, the service error 312 causes the actual allocated budget 310 to drop below the pacing plan 302 due to a communication fault or another issue in serving content items.

The digital pacing modification system 202 can detect a service error using a variety of methods. For instance, in one or more instances, the digital pacing modification system 202 detects a service error when placing or serving content items from a digital content distribution campaign. For example, the digital content campaign system reports that content items are not being successfully placed to a number of client devices. In another instance, the digital pacing modification system 202 detects a service error during the reporting stages of the digital content distribution campaign. For example, the online automated billing system fails to receive reports of placed content items for a specified period of time (e.g., 5 minutes, 30 minutes, or 1 hour).

In some instances, the digital pacing modification system 202 detects a service error based on the actual allocated budget of the digital content distribution campaign. In one or more embodiments, the digital pacing modification system 202 compares the actual allocated budget for a given time to the targeted budget allocation 304 for the same time. If, for the given time, the actual allocated budget is below the targeted budget allocation by a service threshold, then the digital pacing modification system 202 determines that a service error has occurred. In some embodiments, the service threshold can be, or correspond with, the lower band 306 of the pacing plan 302.

In other embodiments, the service threshold is based on a percentage or amount of the pacing plan 302. For instance, the service threshold can be a percentage of the targeted budget allocation 304 at a given time or a percentage of the final allocation target 309. In another instance, the service threshold is an amount below the targeted budget allocation 304 at a given time. In an additional instance, the service threshold is a percentage of the total budget (e.g., the final allocation target 309), which, in various embodiments, decreases over time.

As examples of potential service thresholds, the digital pacing modification system 202 can compare an allocated budget 314 at time t to a service threshold that corresponds to a targeted budget allocation 315 and/or a lower band 317 at time t to detect the service error 312. If the service threshold is the lower band 306, then the digital pacing modification system 202 detects a service error because the actual allocated budget 314 is below the lower band 317 at time t. If the service threshold is an amount below the targeted budget allocation 315 (e.g., $60 below the targeted budget allocation 304), the digital pacing modification system 202 compares the actual allocated budget 314 (i.e., $20) at time t to the difference between the targeted budget allocation 304 and the amount (i.e., $85−$60 or $5) at time t to determine that the service error 312 occurred.

As shown, the service error 312 spans from about hour 8 to hour 15. The digital pacing modification system 202 can detect the service error 312 as soon as it crosses the service threshold. For example, if the service threshold is the lower band 306, then the digital pacing modification system 202 can detect the service error 312 occurs between hour 11 and hour 12. In some embodiments, when a service error is detected, the digital pacing modification system 202 performs tests to verify if the service error is ongoing or concluded. For example, the digital pacing modification system 202 places test content items to the same client devices that are targeted by the digital content distribution campaign to determine if the service error is resolved. Once the tests start yielding positive results, the digital pacing modification system 202 can determine that the service error is resolved and resume the digital content distribution campaign.

Further, in some embodiments, the digital pacing modification system 202 can notify a system administrator of the service error along with information about the service error (e.g., audience information, client device information for client devices associated with the service error, and/or the content items that are affected by the service error). Upon the service error resolving, the system administrator can indicate to the digital pacing modification system 202 that the service error has been resolved.

Figure 3B:
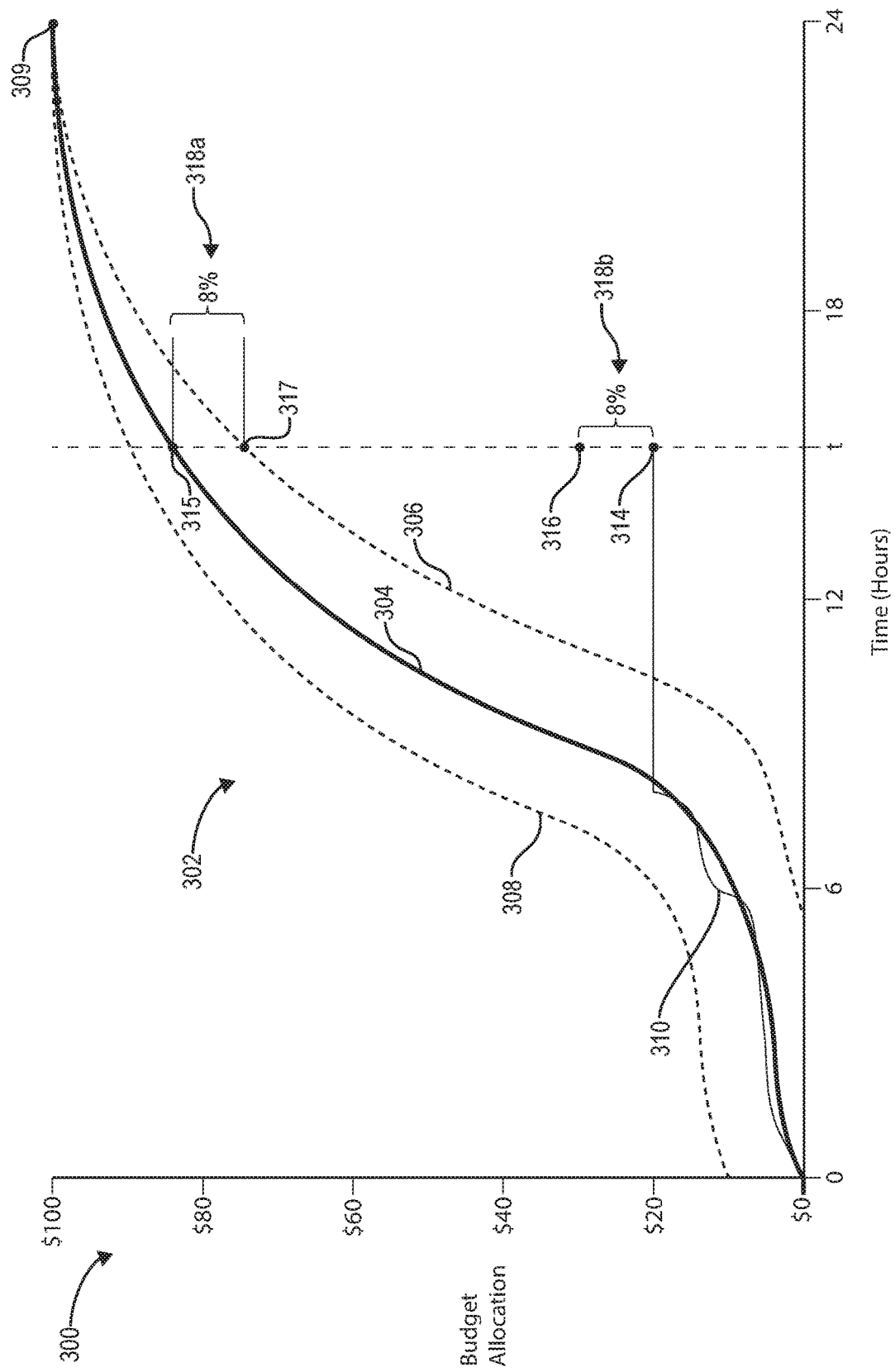

In response to detecting the service error 312 (and in some cases that the service error 312 has been resolved), the digital pacing modification system 202 can generate a new pacing plan. To illustrate, FIG. 3B shows the digital pacing modification system 202 generating a new pacing plan based on the allocated budget 314. For instance, the digital pacing modification system 202 uses the allocated budget 314 to determine a starting position for the new pacing plan. FIG. 3B also includes a starting location of the new targeted budget allocation 316, which is further described below.

In one or more embodiments, the digital pacing modification system 202 sets the new lower band of the new pacing plan to begin at or near the actual allocated budget 314. In these embodiments, the digital pacing modification system 202 can also identify a starting location of the new targeted budget allocation based on the starting location of the new lower band. For example, using the tolerance distance between the lower band 306 and the targeted budget allocation 304 of the original pacing plan 302 at a given time, the digital pacing modification system 202 identifies the starting location of the new targeted budget allocation for the new pacing plan.

To illustrate, FIG. 3B shows the targeted budget allocation 315 and the lower band 317 at time t. Moreover, FIG. 3B also illustrates that the first lower band tolerance distance 318a, at time t, between the targeted budget allocation 315 and the lower band 317 is 8% (e.g., 8% of the targeted budget allocation 304). Accordingly, the digital pacing modification system 202 employs the first lower band tolerance distance 318a (i.e., 8%) of the actual allocated budget 314 (i.e., the starting location of the new lower band) to determine the starting location of the new targeted budget allocation 316.

Stated differently, the digital pacing modification system 202 can add the difference between the targeted budget allocation 315 and the lower band 317 at time t to identify the tolerance distance to apply to the new pacing plan. For example, the digital pacing modification system 202 subtracts the amount of the lower band 317 at time t (i.e., $75) from the amount of the targeted budget allocation 315 at time to (i.e., $85) to determine a lower band tolerance amount (e.g., $10). Next, the digital pacing modification system 202 identifies the amount of the actual allocated budget 314 at time t (i.e., $20). The digital pacing modification system 202 then adds the lower band tolerance amount (e.g., $10) to the actual allocated budget 314 at time t (i.e., $20) to identify the amount of the starting location of the new targeted budget allocation 316 at time t (e.g., $30). Accordingly, the first lower band tolerance distance 318a is equal to the new lower band tolerance distance 318b.

In some embodiments, the digital pacing modification system 202 does not employ the first lower band tolerance distance 318a for the second new band tolerance distance 318b. Instead, as mentioned above, in one or more embodiments, the digital pacing modification system 202 employs a predetermined tolerance distance to serve as the distance between the starting location of the new lower band (e.g., the actual allocated budget 314) and the starting location of the new targeted budget allocation 316. The predetermined tolerance distance can be a percentage of the targeted budget allocation 304 at time t, a percentage of the final allocation target (given time t), a set amount ($5), or a set amount that varies based on the amount of remaining time (e.g., $1 for each remaining hour).

In various embodiments, the digital pacing modification system 202 determines the distance between the starting location of the new lower band and the starting location of the new targeted budget allocation 316 based on a combination of factors. For example, the digital pacing modification system 202 can utilize the lower band threshold distance described above divided by the time of the service error (e.g., hours or percentage of time offline). In this manner, a longer service errors results in a smaller new lower band threshold distance, which allows the digital content distribution campaign to align with a new pacing plan more quickly.

Figure 3C:
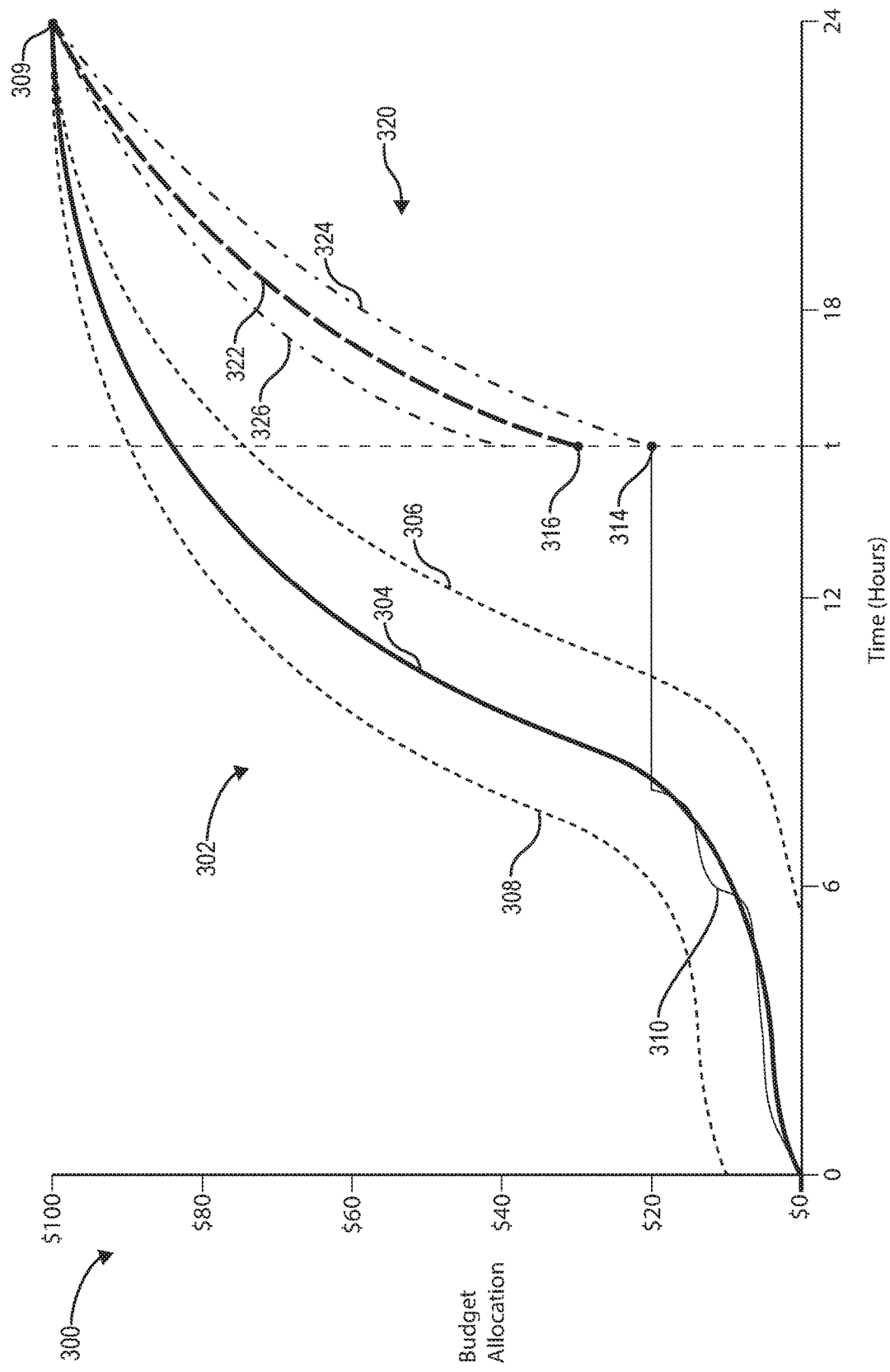

As mentioned above, the digital pacing modification system 202 can also generate a new pacing plan utilizing the locations of a new lower band and a new targeted budget allocation. To illustrate, FIG. 3C shows a new pacing plan 320. As shown, the new pacing plan 320 includes a new targeted budget allocation 322, a new lower band 324, and a new upper band 326. As shown, the new targeted budget allocation 322 begins at the starting location for the new targeted budget allocation 316 and the new lower band starts at the actual allocated budget 314. In addition, as shown, the new upper band has the same threshold distance as the new lower band threshold distance (e.g., 8% or $10). Notably, the new pacing plan 320 ends at the final allocation target 309.

The digital pacing modification system 202 can determine the new pacing plan 320 by transforming the original pacing plan 302. For instance, in one or more embodiments, the digital pacing modification system 202 applies a linear transformation to the original targeted budget allocation 304 to generate the new targeted budget allocation 322. In particular, the digital pacing modification system 202 linearly transforms the original targeted budget allocation 304 from time t to the final time (e.g., 24 hours) to generate the new targeted budget allocation 322, such that the new targeted budget allocation 322 begins at the actual allocated budget 314 and concludes at the final allocation target 309.

In some embodiments, the transformation is a non-rigid transformation where the size of the original targeted budget allocation 304 changes, but the shape of the original targeted budget allocation 304 is largely maintained. For example, the digital pacing modification system 202 generates the new pacing plan 320 by scaling, skewing, rotating, translating, dilating, stretching, moving, normalizing, and/or otherwise modifying the original pacing plan 302. To illustrate, the digital pacing modification system 202 generates the new targeted budget allocation 322 by copying a segment of the original targeted budget allocation 304 between time t and the final time, then rotating and stretching the segment to fit between the actual allocated budget 314 and the final allocation target 309. In this manner, the new targeted budget allocation 322 maintains the general shape of the original targeted budget allocation 304 between time t and the final time.

In one or more embodiments, the digital pacing modification system 202 generates the new pacing plan 320 based on the original pacing plan 302 by generating the new pacing plan 320 using the same data used to generate the original pacing plan 302. As mentioned above, the digital pacing modification system 202 generated the original pacing plan 302 based on user characteristics for users (e.g., past daily user activity rates) in the target audience for the digital content distribution campaign. Accordingly, the digital pacing modification system 202 can employ the same user characteristics to generate the new pacing plan 320.

Moreover, in some embodiments, the digital pacing modification system 202 uses a subset of the user characteristics to generate the new pacing plan 320. For example, if the user characteristics are associated with user activity levels at different times of the day, the digital pacing modification system 202 can identify the times of day corresponding to the remaining time in the digital content distribution campaign (e.g., between time t and the final time). Using the identified user characteristics corresponding to the remaining time, the digital pacing modification system 202 can generate the new pacing plan 320. In this manner, both the original targeted budget allocation 304 and the new targeted budget allocation 322, between time t to the final time, correspond to the same subset of user characteristics.

As shown in FIG. 3C, the actual allocated budget 314 intersects with the new lower band 324 of the new pacing plan 302. Because the actual allocated budget 314 is at the new lower band 324, the digital pacing modification system 202 applies one or more maximum bids at an online automated auction forum to jump start the digital content distribution campaign after the service error 312. However, because the digital pacing modification system 202 employs the new pacing plan 320, the digital pacing modification system 202 will only bid the maximum bid value for a short duration of time (i.e., to prevent spending too much of the resources (e.g., budget) allocated to the digital content distribution campaign).

Notably, in relation to the embodiment of FIG. 3B, the digital pacing modification system 202 generates new targeted budget allocation 322 above the actual allocated budget 314 rather than at the actual allocated budget 314. Because the digital pacing modification system 202 generates the new targeted budget allocation 322 above the actual allocated budget 314, the digital pacing modification system 202 can increase the bid value for a short duration following the service error 312 (thus preventing the digital content distribution campaign from falling further behind and failing to reach the final allocation target 309).

Figure 3D:
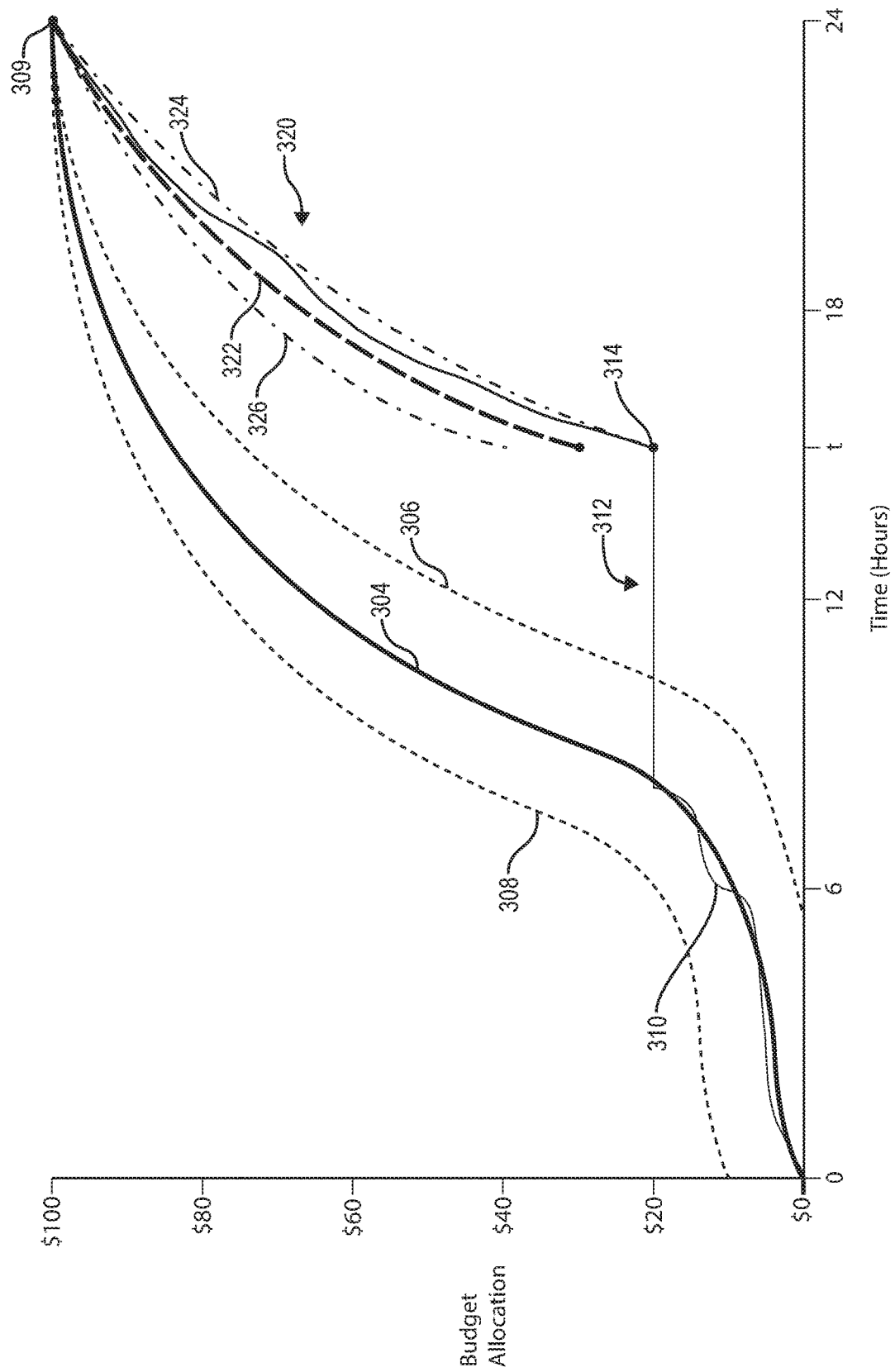

Using the new pacing plan 320, the digital pacing modification system 202 can resume the digital content distribution campaign after detecting the service error 312. To illustrate, FIG. 3D shows the actual allocated budget 310 following the new pacing plan 320 from the end of the service error 312 to the final time. As shown, the digital pacing modification system 202 uses the new pacing plan 320 to ensure that the digital content distribution campaign finishes at the final allocation target 309 without causing a bidding spike.

In one or more embodiments, the digital pacing modification system 202 adjusts the bidding values for the new pacing plan 320 (e.g., based on the actual target budget allocation 304, the new lower band 324, and/or the new upper band 326). Indeed, as time progresses, the digital pacing modification system 202 can track actual target budget allocation 304 relative to the new lower band 324 and generate bid values for impression opportunities based on the actual target budget allocation 304 and the new lower band 324 (e.g., providing max bids when the actual lower band 324 intersects the new lower band 324 as described above).

In one or more embodiments, the digital pacing modification system 202 generates a new pacing plan by only creating a new lower band that replaces the original lower band. For example, the digital pacing modification system 202 generates a new pacing plan 320 that includes the new lower band 324, but copies or maintains the original targeted budget allocation 304. In addition, the digital pacing modification system 202 transforms the bidding value range to span between the targeted budget allocation 304 (e.g., the average bid value) and the new lower band 324 (e.g., the maximum bid value) such that as the actual allocated budget 310 moves away from the new lower band 324 toward the targeted budget allocation 304, the digital pacing modification system 202 begins to reduce the bid value. In this manner, the actual allocated budget 310 aggressively rises toward the original targeted budget allocation 304, but rises more gradually and efficiently than the bid spiking caused by conventional systems described above.

Although the foregoing description in relation to FIG. 3B describes an order in relation to determining the new lower band 324 and the new target budget allocation 322, the digital pacing modification system 202 can generate new target budget allocations, new upper bands, and/or new lower bands in any order. For example, in one or more embodiments, the digital pacing modification system 202 generates the new target budget allocation 322 (e.g., based on the actual budget allocation 314 at time t) and then generates the lower band 324.

Figure 4:
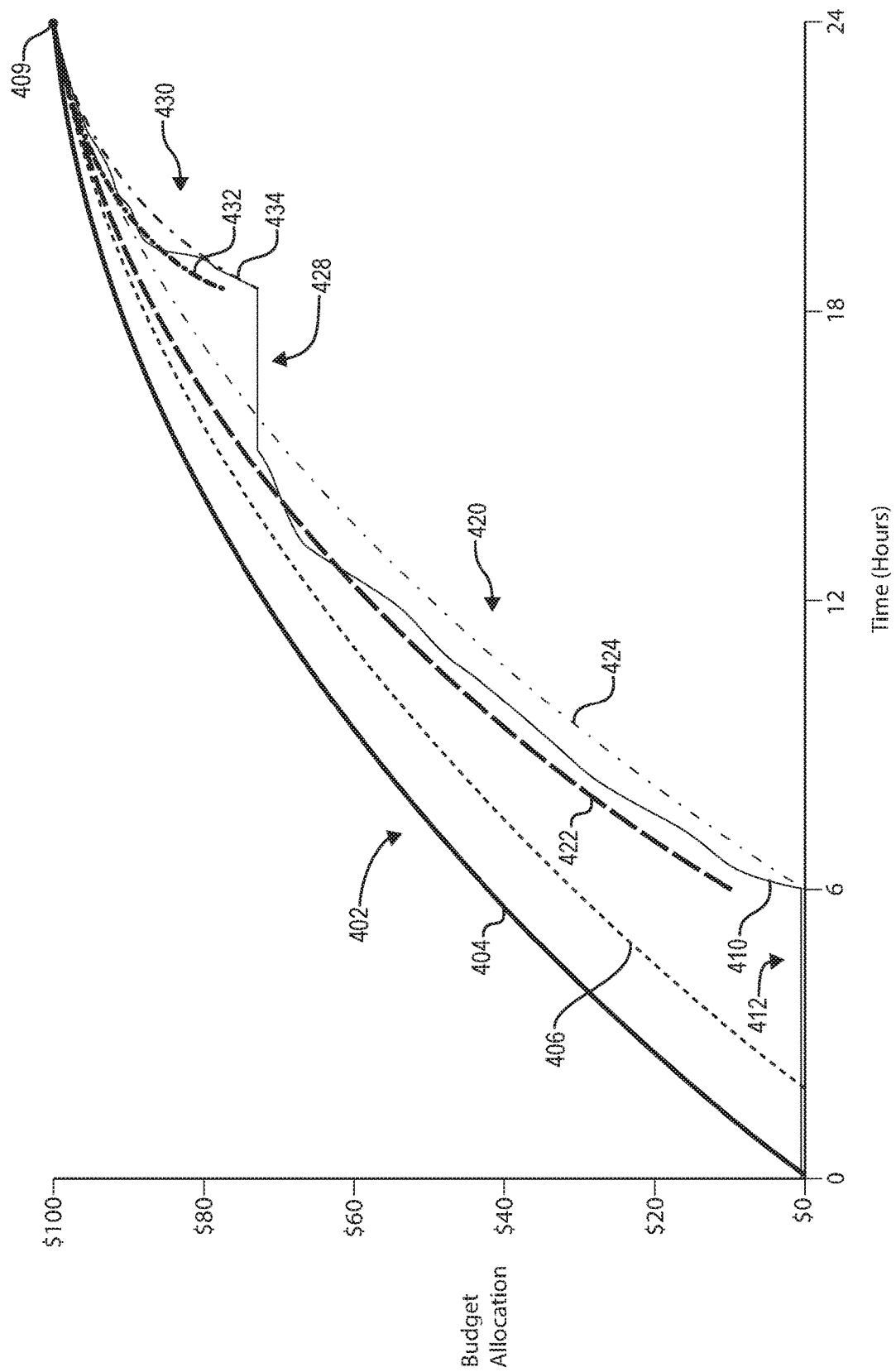
FIG. 4 illustrates an example graph that shows generating multiple new pacing plans for a digital content distribution campaign in accordance with one or more embodiments disclosed herein.

In some instances, a digital content distribution campaign suffers from multiple service errors. To illustrate, FIG. 4 shows an example graph 400 of generating multiple new pacing plans based on multiple service errors in accordance with one or more embodiments. As shown, the graph 400 includes a pacing plan 402, a new pacing plan 420, and a second new pacing plan 430. In addition, the graph 400 includes a first service error 412 and a second service error 428 that impact the actual allocated budget 410.

The pacing plan 402, as illustrated, includes a targeted budget allocation 404 and a lower band 406. The new pacing plan 420 includes a new targeted budget allocation 422 and a new lower band 424. The second new pacing plan 430 includes a second new targeted budget allocation 432 and a second new lower band 434. Each of the pacing plans can also include upper bands (not illustrated).

As shown, the actual allocated budget 410 initially suffers from a first service error 412 for the first quarter of the digital content distribution campaign (i.e., for hour 0 to hour 6). As a result of the first service error 412, the digital content distribution campaign does not place any content items at client devices for the first six hours, and thus, falls off course (i.e., deviates) from the pacing plan 402.

As previously described, the digital pacing modification system 202 can detect the first service error 412 using a variety of actions. In response to detecting the first service error 412, the digital pacing modification system 202 generates a new pacing plan 420. As shown the new pacing plan 420 enables the actual allocated budget 410 at hour 6 to gradually and efficiently catch up to and follow the new targeted budget allocation 422 of the new pacing plan 420. Specifically, the actual allocated 410 is on pace to finish at the final allocation target 409 following the new pacing plan 320.

Around hour 15, the actual allocated budget 410 encounters a second service error 428. For example, a communication fault prevents content items from being placed at client devices for three hours (i.e., until hour 18). Again, the digital pacing modification system 202 detects the second service error 428 and automatically generates a second new pacing plan to account for the service error. In particular, the digital pacing modification system 202 generates a second new pacing plan 430 in response to the second service error 428. Using the second new pacing plan 430, the digital pacing modification system 202 successful ends the digital content distribution campaign at the final allocation target 409, as shown by the actual allocated budget 410.

As illustrated, each of the pacing plans starts at a given time in relation to the actual allocated budget 410 and end at the final allocation target 309. In particular, the pacing plan 402 includes the lower band 406 that begins at the actual allocated budget at the start time (i.e., hour 0 and budget allocation $0), the new pacing plan 420 utilizes the new lower band 424 that begins at the location of the actual allocated budget at the end of the first service error 412 (i.e., hour 6 and budget allocation $0), and the second new pacing plan 430 utilizes the second new lower band 434 that begins at the location of the actual allocated budget at the end of the second service error 428 (i.e., between hours 18-19 and budget allocation $75).

Although each of the placing plans in FIG. 4 utilize lower bands that start at the actual allocated budget 410 at a given time, in one or more embodiments, the digital pacing modification system 102 utilize a different starting point for the lower band (and/or the targeted budget allocation). For example, the digital pacing modification system 102 can generate a starting point for a lower band based on an actual allocated budget, but that is not identical to the actual allocated budget. To illustrate, the digital pacing modification system 102 can generate a starting point for a lower band that is a pre-defined amount (e.g., a set dollar amount or percentage) lower than the actual allocated budget. In this manner, the digital pacing modification system 102 can increase bid values after a service error without maximizing the bid values.

As shown in FIG. 4, the digital pacing modification system 202 can generate multiple new pacing plans based on detecting multiple service errors. For example, the digital pacing modification system 202 can monitor the actual allocated budget 410 and the one or more pacing plans at a scheduled interval (e.g., 5 minutes, 10 minutes, 30 minutes) to check for new service errors. In addition, in some cases, as described above, the digital pacing modification system 202 further tests a detected service error to determine whether the service error has been resolved before generating a new pacing plan.

In one or more embodiments, the digital pacing modification system 202 employs a timeout period before generating a new or second new pacing plan. For example, the digital pacing modification system 202 can wait at least 30 minutes before generating a new pacing plan, which preserves computing resources needed to generate additional pacing plans. In some embodiments, the digital pacing modification system 202 sets a cut-off time near the end of the digital content distribution campaign (e.g., 2-hours or 10% of the digital content distribution campaign remaining) where no additional pacing plans are generated.

Moreover, in relation to the embodiment of FIG. 4, the digital pacing modification system 202 generates the second new pacing plan 430 utilizing the original pacing plan 402 and/or the new pacing plan 420. As mentioned above, in one or more embodiments, the new pacing plan 420 is a transformation of the original pacing plan 402. Accordingly, in relation to FIG. 4, the digital pacing modification system 102 also generates the second new pacing plan 430 by applying a similar transformation. Specifically, the digital pacing modification system 102 can apply a transformation from either the original pacing plan 402 or the new pacing plan 420.

Figures 5A, 5B:
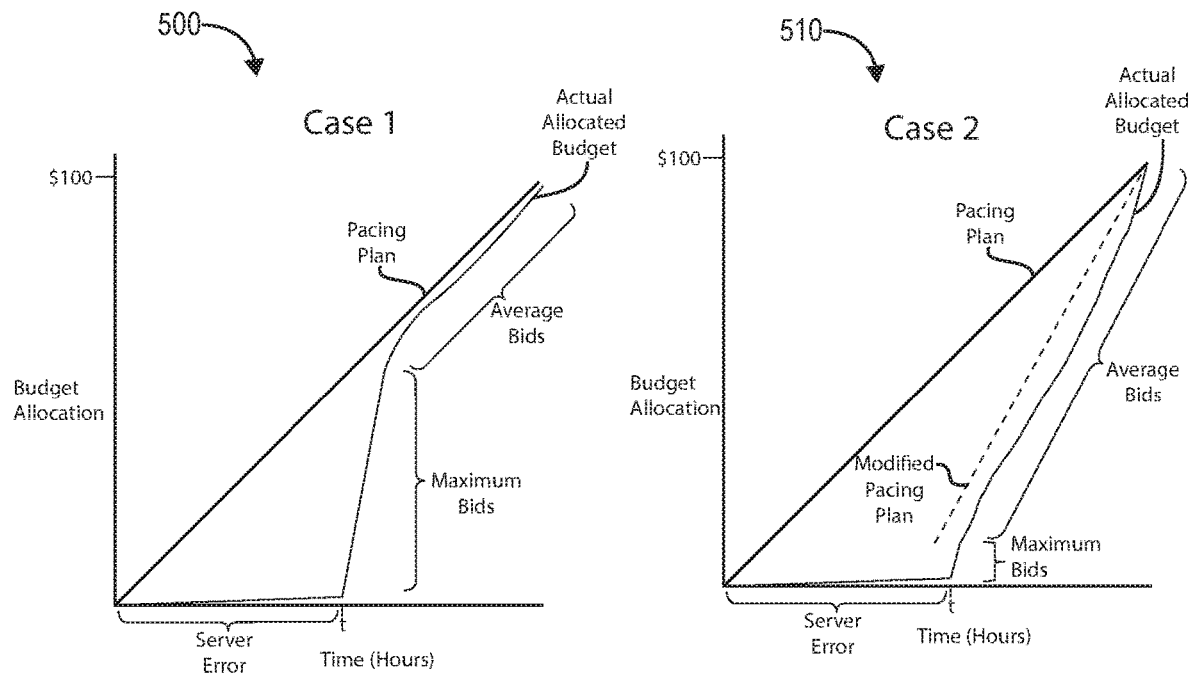
FIGS. 5A and 5B illustrate a graphical and numerical comparison between conventional systems and one or more embodiments disclosed herein for resolving a digital content distribution campaign having a service error.

Turning now to FIGS. 5A and 5B, an additional example will be given that compares results of conventional systems to the embodiments of the digital pacing modification system 202 disclosed herein. In particular, FIGS. 5A and 5B illustrate a graphical and numerical comparison between conventional systems and one or more embodiments of the digital pacing modification system 202 for resolving a digital content distribution campaign with a detected service error.

To illustrate, FIG. 5A compares a first graph 500 of a conventional system (e.g., Case 1) experiencing a service error to a digital content distribution campaign and a second graph 510 of the digital pacing modification system 202 (e.g., Case 2) likewise experiencing the service error. Specifically, the first graph 500 for Case 1 shows a conventional system reacting to the service error by spike bidding at the maximum bid value after the service error until the actual allocated budget reaches the pacing plan. In contrast, the second graph 510 for Case 2 shows the digital pacing modification system 202 responding to the same service error by generating and employing a new pacing plan for the digital content distribution campaign.

As shown in the first graph 500 for Case 1, the conventional system spends half of the allocated budget (e.g., $50) bidding content items at the maximum bid value. Indeed, the conventional system causes a large bidding spike of maximum bids to bring the actual allocated budget at time t back on course to the pacing plan. Once the actual allocated budget approaches the pacing plan, the conventional system finishes the digital content distribution campaign by bidding the average bid value.

Notably, each maximum bid spends more of the allocated budget than an average bid or another less-than-maximum bid. Thus, while the first graph 500 shows the actual allocated budget quickly catching up to the pacing plan in a short time period using maximum bids, the conventional system does so at the expense of spending half of the allocated budget in the same short time period. Indeed, by employing spike bidding to recover from a service error, conventional systems can quickly deplete the resources that a publisher allocates to a digital content distribution campaign.

In contrast to Case 1, the second graph 510 for Case 2 shows the digital pacing modification system 202 spending a small percentage of the allocated budget (e.g., $10) on maximum bids before approaching the new pacing plan. Accordingly, the digital pacing modification system 202 uses the remainder of the budget on average bids, which enables the digital content distribution campaign to serve more content items to client devices for the same allocated budget.

To further illustrate, FIG. 5B shows example enumerated amounts corresponding to Case 1 and Case 2 described above in connection with FIG. 5A. For instance, both Case 1 and Case 2 have the same allocated budget of $100, maximum bid value of $0.10, and average bid value of $0.05. In addition, based on the bidding spike shown in Case 1, the conventional system spends $50 (or 50% of the allocated budget) on maximum bids and $50 (or 50%) on average bids, which yields 500 maximum bids and 1,000 average bids. Accordingly, the conventional system spends the full allocated budget to win a total of 1,500 bids for impression opportunities (which can correspond to populating the impression opportunities at client devices).

For Case 2, the digital pacing modification system 202 spends $10 (or 10% of the allocated budget) on maximum bids and $90 (or 90%) on average bids, which yields 500 maximum bids and 1,000 average bids, which yields 100 maximum bids and 1,800 average bids. Therefore, the digital pacing modification system 202 wins and populates a total of 1,900 impression opportunities at client devices, which is 400 more populated impression opportunities than in Case 1.

Moreover, as shown, the digital pacing modification system 202 is more efficient than conventional systems in recovering from a service error. To illustrate, suppose that the ideal total number of winning bids is 2,000 bids, which occurs when the digital content distribution campaign does not experience a service error and the digital pacing modification system 202 wins bids at the average bid value. Comparing Case 1 and Case 2 to the ideal number, Case 1 is 75% of the ideal (i.e., 1,500/2,000) and Case 2 is 95% of the ideal (i.e., 1,900/2,000). Indeed, based on the amounts provided in this example, employing the new pacing plan by the digital pacing modification system 202 (i.e., Case 1) is 20% more efficient (i.e., 95%–75%) than employing bid spiking by the conventional system (i.e., Case 1).

Figure 6:
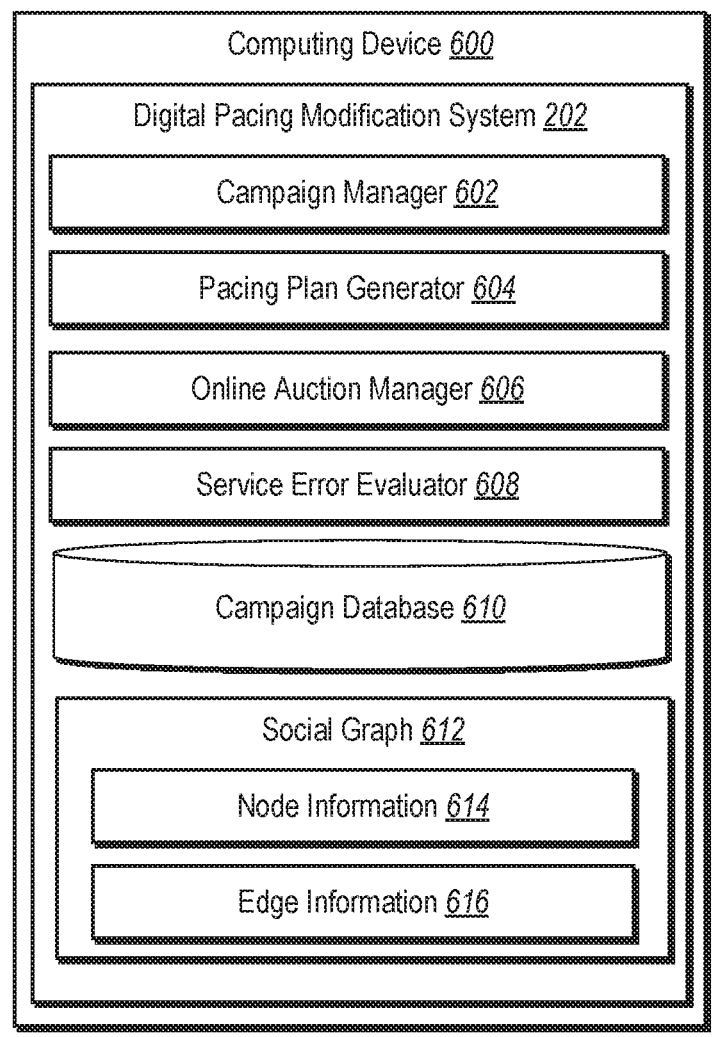
FIG. 6 illustrates a schematic diagram of the digital pacing modification system in accordance with one or more embodiments disclosed herein.

FIG. 6 illustrates a schematic diagram of the digital pacing modification system 202 in accordance with one or more embodiments. As shown, the digital pacing modification system 202 is implemented via a computing device 600. The computing device 600 can comprise a server, such as the server(s) 201 (and/or servers corresponding to the digital content campaign system 204, the online content auction system 206, the online automated billing system 208) or another server device. In some embodiments, the computing device 600 comprises a client device. Additional description regarding computing devices is provided below with respect to FIG. 8.

As shown, the computing device 600 includes the digital pacing modification system 202. The digital pacing modification system 202 includes a campaign manager 602, a pacing plan generator 604, an online auction manager 606, a service error evaluator 608, a campaign database 610, and a social graph 612 (comprising node information 614 and edge information 616). Although illustrated together, the components shown in the computing device 600 can be joined or divided in a variety of configurations.

The digital pacing modification system 202, as shown, includes the campaign manager 602. In general, the campaign manager 602 receives, stores, analyzes, modifies, and/or provides campaign information and parameters. For example, in one or more embodiments, the campaign manager 602 communicates with a publisher via a publisher device to create and modify digital content distribution campaigns. For instance, a publisher provides campaign parameters for a digital content distribution campaign that specifies properties of the campaign, such as the maximum bid value or price for content items and/or an allocated budget. In some embodiments, the campaign manager 602 provides campaign information and/or parameters to an online automated content server, as described above.

Further, the campaign manager 602 follows a pacing plan (e.g., an original or new pacing plan, as described below) to run an efficient and successful campaign. For example, the campaign manager 602 modifies campaign parameters and campaign information provided to the online auction manager 606 (described below) to change the bidding values for a digital content distribution campaign. In this manner, by following a pacing plan, the campaign manager 602 can increase or decrease the rate of a digital content distribution campaign to enable the campaign to use up the full allocated budget (e.g., finish at the final allocation target).

In one or more embodiments, the campaign manager 602 stores campaign information parameters within the campaign database 610. As mentioned above, campaign parameters can define the objective, budget, scope, and duration of the digital content distribution campaign. For instance, campaign parameters include the objective of the digital content distribution campaign (e.g., traffic, exposure, impressions, clicks, downloads, lead generations, shares, app installs, video views, conversions, or sales), costs and resources the publisher is willing to spend on a digital content distribution campaign (e.g., daily budget and/or lifetime budgets), bidding preferences (e.g., maximum and average bid values), targeting parameters, the duration and schedule of the campaign, the reach of the campaign, the communications channel on which to advertise (e.g., websites, search results, social networks, mobile applications, or multiple channels), billing preferences (e.g., how much and how often to bill), and content items (e.g., advertisements) to include in the digital content distribution campaign.

The pacing plan generator 604 generates one or more pacing plans for a digital content distribution campaign. For example, the pacing plan generator 604 generates original pacing plans as well as new pacing plans for a digital content distribution campaign. For instance, the pacing plan generator 604 generates a pacing plan that includes a targeted budget allocation, a lower band, and/or an upper band. As mentioned above, the campaign manager 602 can employ the pacing plan to run an efficient and successful digital content distribution campaign.

In addition, in response to detecting a service error (described below), the pacing plan generator 604 generates a new pacing plan for a digital content distribution campaign. For instance, the pacing plan generator 604 generates a new pacing plan by transforming the original pacing plan from a given time (i.e., intermediary time) to the final time. In some embodiments, the pacing plan generator 604 applies a linear transformation of the original pacing plan to generate the new pacing plan, as described above.

In addition, the digital pacing modification system 202 includes the online auction manager 606. In general, the online auction manager 606 facilitates an online automated auction forum. For example, the online auction manager 606 creates bids for a digital content distribution campaign of a publisher based on campaign parameters associated with a digital content distribution campaign, as previously described. In addition, the online auction manager 606 identifies impression opportunities and creates a forum where advertisers bid against each other to win the impression opportunities, as described above.

The digital pacing modification system 202 also includes the service error evaluator 608. In general, the service error evaluator 608 determines when a service error occurs to a digital content distribution campaign. For instance, in one or more embodiments, the service error evaluator 608 determines that the current amount of an actual allocated budget is below the service threshold from a pacing plan. In some embodiments, the service threshold is based on the lower band of the pacing plan.

In one or more embodiments, the service error evaluator 608 communicates with an online automated billing system to detect when a service error occurs. For example, as described above, the online automated billing system provides an indication that content items for a digital content distribution campaign have not been counted or reported (e.g., triggering events for the content items are not occurring) for a specified period of time. Accordingly, the service error evaluator 608 determines a service error to the digital content distribution campaign based on the provided indication. Once a service error is detected, the pacing plan generator 604 can generate a new pacing plan, as described above.

As shown, the digital pacing modification system 202 includes the social graph 612, which includes node information 614 and edge information 616. The social graph 612 can include node information 614 that stores information comprising nodes for users, nodes for concepts, and/or nodes for content items. In addition, the social graph 612 can include edge information 616 comprising relationships between nodes and/or actions occurring within the social-networking system. Further detail regarding social-networking systems, social graphs, edges, and nodes is presented below.

The digital pacing modification system 202 can communicate with the social graph 612 to perform its functions. For example, the digital pacing modification system 202 can utilize the social graph 612 to obtain impression opportunities and provide content items. For instance, the digital pacing modification system 202 can obtain user information that includes specific details regarding the user to whom a content item is to be placed. Accordingly, the digital pacing modification system 202 can use the received information to match targeting parameters in conducting an online auction. In addition, the digital pacing modification system 202 can place content items from various digital content distribution campaigns utilizing the social graph 612 (e.g., within a social networking news feed). For example, the digital pacing modification system 202 can provide a content item to the social graph 612 to a user where the content item corresponds to a winning bid for an impression opportunity.

In one or more embodiments, the components 602-616 of the computing device 600 can comprise software, hardware, or both. For example, the components 602-616 can comprise one or more instructions stored on a computer-readable storage medium and executable by processors of one or more computing devices. When executed by the one or more processors, the computer-executable instructions of the digital pacing modification system 202 can cause the computing device 600 to perform the methods described herein. Alternatively, the components 602-616 and their corresponding elements can comprise hardware, such as a special purpose processing device to perform a certain function or group of functions. Additionally, the components 602-616 can comprise a combination of computer-executable instructions and hardware.

Figure 7:
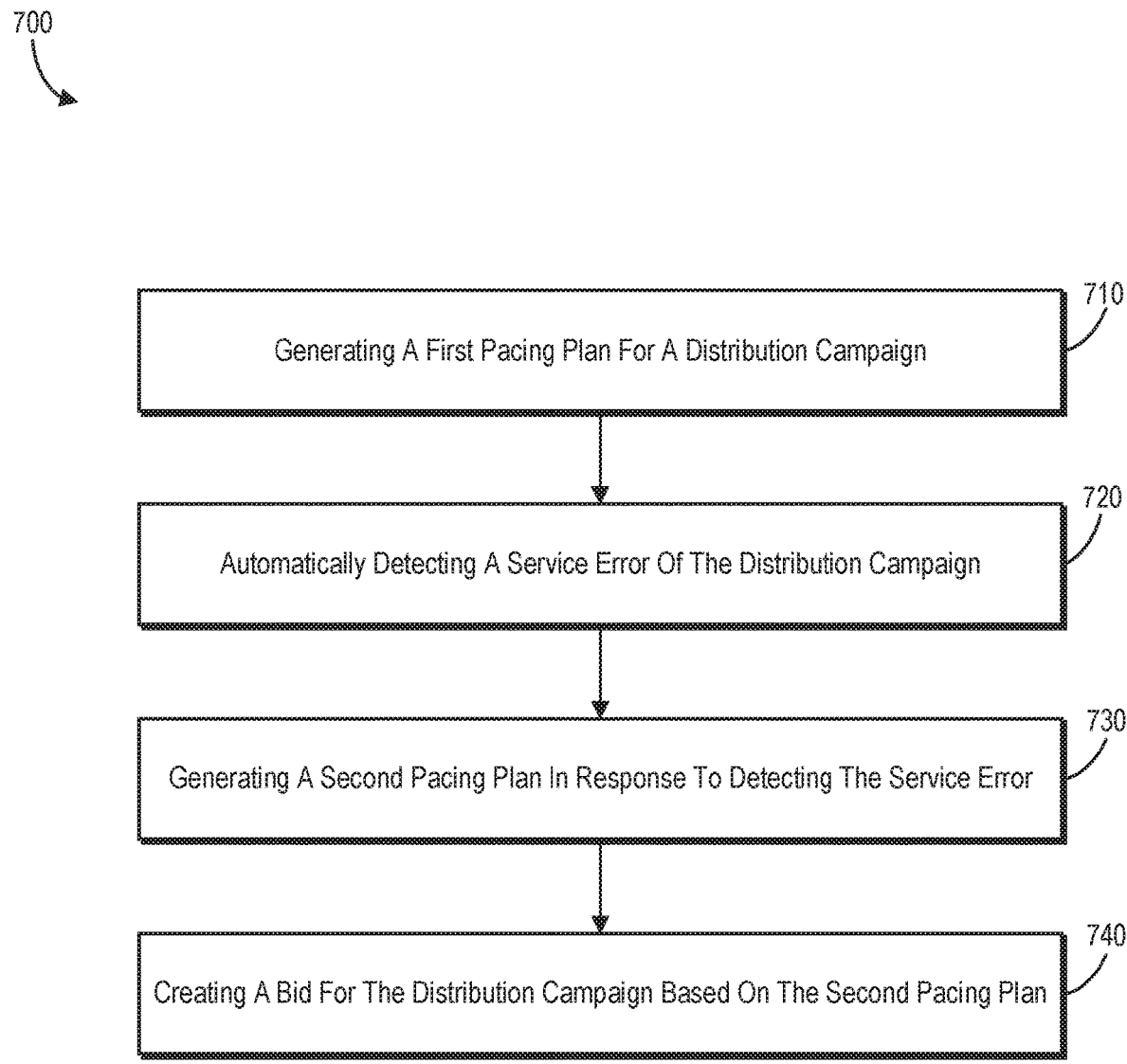
FIG. 7 illustrates a flowchart of a series of acts for automatically modifying a pacing plan of a digital content distribution campaign in accordance with one or more embodiments described herein.

FIGS. 1-6, the corresponding text, and the examples provide a number of different methods, systems, devices, and non-transitory computer readable media for automatically detecting a service error and modifying a pacing plan. FIG. 7 illustrates a flowchart of a series of acts 700 of automatically modifying a pacing plan of a digital content distribution campaign in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In some embodiments, a system can perform the acts of FIG. 7.

The series of acts 700 includes an act 710 of generating a first pacing plan for a distribution campaign. As illustrated, the act 710 may involve generating a first pacing plan for a digital content distribution campaign executed via an online automated auction forum, where the first pacing plan includes a first target budget allocation over time and a first lower band for setting bid values for the digital content distribution campaign at the online automated auction forum. In one or more embodiments, generating the first pacing plan is based on characteristics of a target audience corresponding to a time period between a start time of the first pacing plan and the final time of the digital content distribution campaign. In some embodiments, the first pacing plan further includes a first upper band based on the first target budget allocation.

In one or more embodiments, the series of acts 700 includes an act of creating a first bid for the online automated auction forum for the digital content distribution campaign to serve digital content to a client device by comparing a first actual allocated budget relative to the first lower band. For instance, the first actual allocated budget includes the spent amount of an allocated budget up to an intermediary time for the digital content distribution campaign. In some embodiments, the online automated auction forum bids for impression opportunities, where a winning bid corresponds to placing a content item at that impression opportunity or populating the impression opportunity.

As illustrated, the series of acts 700 also includes an act 720 of automatically detecting a service error of the distribution campaign. In particular, the act 720 may involve automatically detecting a service error corresponding to an actual allocated budget of the digital content distribution campaign. In one or more embodiments, the act 720 additionally, or alternatively, includes detecting that an actual allocated budget of the digital content distribution campaign is below a service threshold. For example, the service threshold is the first lower band or corresponds to an allocated budget percentage for the first pacing plan for a given time.

In one or more embodiments, the act 720 can include automatically detecting the service error by comparing the actual allocated budget of the digital content distribution campaign at a given time to the first target budget allocation at the given time. In some embodiments, the act 720 can include automatically detecting the service error by determining, at the given time, that the actual allocated budget of the digital content distribution campaign is below the first lower band of the first target budget allocation.

As illustrated, the series of acts 700 includes an act 730 of generating a second pacing plan in response to detecting the service error. In particular, the act 730 may involve generating, in response to detecting the service error, a second pacing plan including a second lower band based on the first pacing plan and the actual allocated budget. In one or more embodiments, the act 730 includes setting the second lower band at the actual allocated budget and/or generating a second target budget allocation above the second lower band, where the second targeted budget allocation is separated from the second lower band by a lower threshold distance.

In some embodiments, the act 730 can also include generating a second target budget allocation by transforming the first target budget allocation between an intermediary time corresponding to the actual allocated budget and a final time corresponding to a conclusion of the first pacing plan. Further, transforming the first target budget allocation to generate the second target budget allocation can be based on characteristics of the target audience corresponding to a time period between the intermediary time (e.g., time t) and the final time. In various embodiments, transforming the first target budget allocation includes applying a linear transformation to the first target budget allocation to generate the second target budget allocation of the second pacing plan.

In additional embodiments, the act 730 can include the first target budget allocation of the first pacing plan and the second target budget allocation of the second pacing plan intersecting at the final time of the digital content distribution campaign. In one or more embodiments, the second pacing plan further includes a second upper band based on the second target budget allocation. Further, a second lower band tolerance distance between the second lower band and the second target budget allocation varies over time.

As illustrated, the series of acts 700 also includes an act 740 of creating a bid for the distribution campaign based on the second pacing plan. In particular, the act 740 may involve creating a bid for the online automated auction forum for the digital content distribution campaign based on the actual allocated budget and the second lower band. In some embodiments, the act 740 also includes creating the bid by setting the bid for the digital content distribution campaign to a maximum bid value based on the actual allocated budget intersecting with the second lower band.

In some embodiments, the series of acts 700 can include an act of increasing bid values as the actual allocated budget approaches the first lower band, where a bid value is a maximum bid value when the first actual allocated budget intersects with the first lower band. Similarly, the series of acts 700 can include an act of decreasing bid values as the actual allocated budget approaches a first upper band of the first pacing plan, where a bid value is a minimum bid value when the first actual allocated budget intersects with the first upper band.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
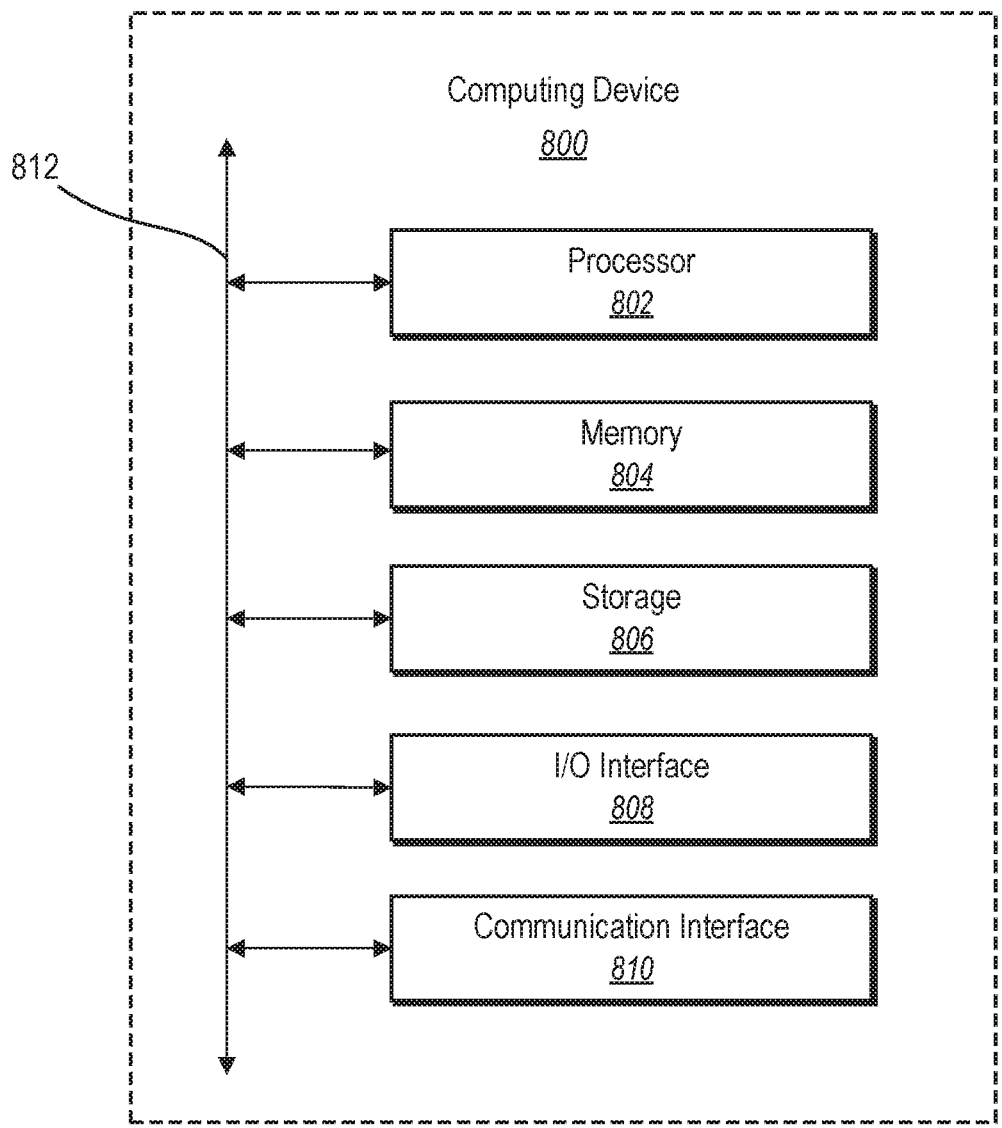
FIG. 8 illustrates a block diagram of a computing device in accordance with one or more embodiments described herein.

FIG. 8 illustrates a block diagram of exemplary computing device 800 that may be configured to perform one or more of the processes described above. One will appreciate that the computing device 800 may represent one or more client devices or server devices, such as those described previously mentioned (e.g., 201, 210, 212, and 600). Further, the computing device 800 may represent various types of computing devices. For example, the computing device 800 can include: a mobile device such as a mobile telephone, a smartphone, a PDA, a tablet, a laptop; a non-mobile device such as a desktop or server; or any other type of computing device.

As shown in FIG. 8, the computing device 800 can comprise a processor 802, a memory 804, a storage device 806, an input/output ("I/O") interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8.

In one or more embodiments, the processor 802 includes hardware for executing instructions, such as those making up a computer program. The memory 804 may be used for storing data, metadata, and programs for execution by the processor(s). The storage device 806 includes storage for storing data or instructions.

The I/O interface 808 allows a user (e.g., content producer or viewer) to provide input to, receive output from, and otherwise transfer data to and receive data from computing device 800. The I/O interface 808 may include a mouse, a keypad or a keyboard, a touchscreen, a camera, an optical scanner, network interface, modem, other known I/O devices or a combination of such I/O interfaces. The I/O interface 808 may also include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, the communication interface 810 may include a network interface controller (NIC) or network adapter for communicating with an Ethernet or another wire-based network or a wireless NIC (WNIC) or wireless adapter for communicating with a wireless network, such as a WI-FI. The communication infrastructure 812 may include hardware, software, or both that connects components of the computing device 800 to each other. As an example, the communication infrastructure 812 may include one or more types of buses.

As mentioned above, the communications system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 9:
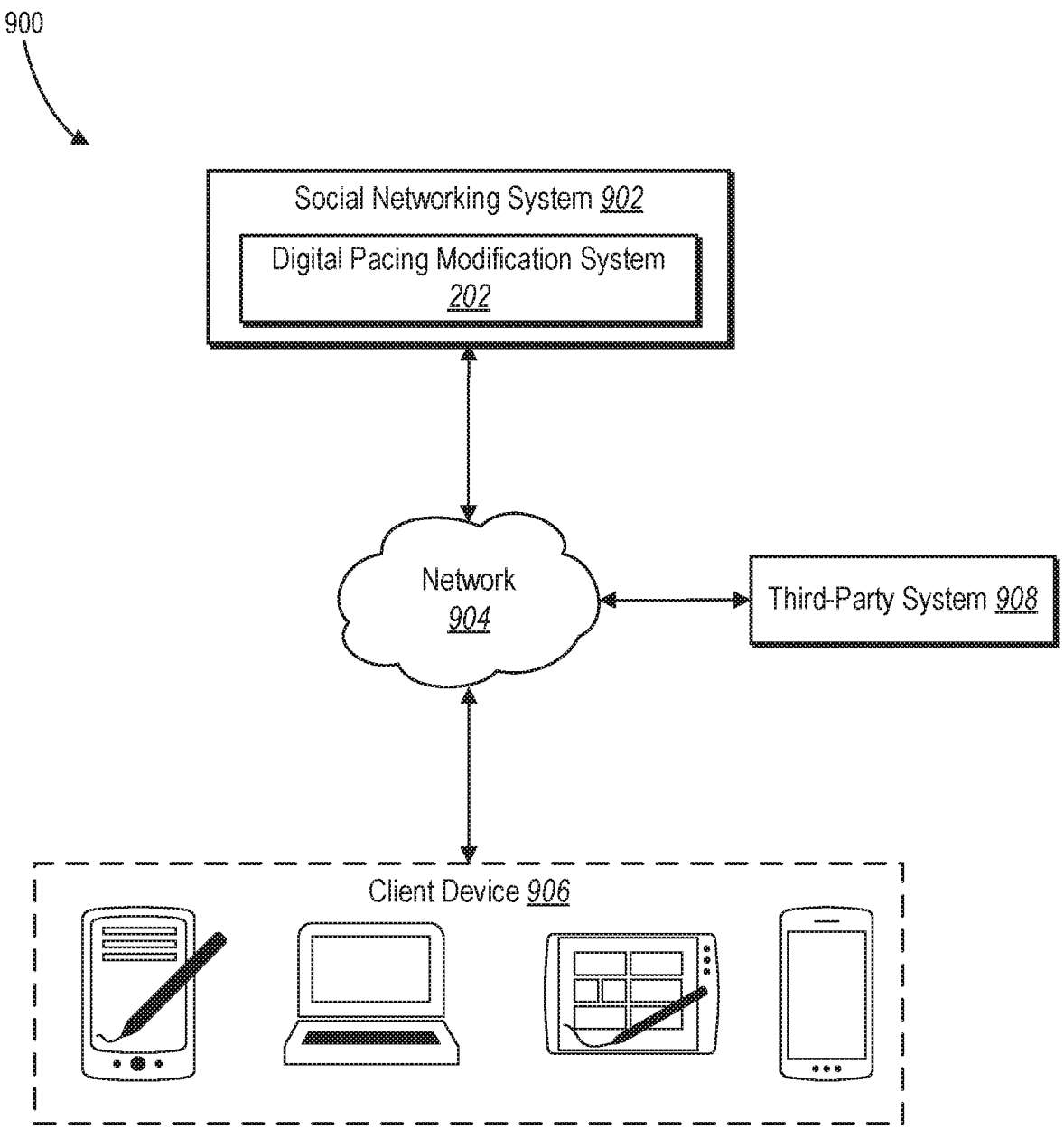
FIG. 9 illustrates a network environment of a social networking system having the digital pacing modification system in accordance with one or more embodiments described herein.

FIG. 9 illustrates an example network environment 900 of a social networking system. The network environment 900 includes a client device 906, a social networking system 902 comprising the digital pacing modification system 202, and a third-party system 908 connected to each other by a network 904. Although FIG. 9 illustrates a particular arrangement of client device 906, the social networking system 902, the third-party system 908, and the network 904, this disclosure contemplates any suitable arrangement and number of client device 906, the social networking system 902, the third-party system 908, and the network 904.

Links may connect the client device 906, the social networking system 902, and the third-party system 908 to the network 904 or to each other. Links need not necessarily be the same throughout network environment 900. One or more first links may differ in one or more respects from one or more second links.

In some embodiments, the client device 906 may be an electronic device including hardware, software, or embedded logic components or a combination of two or more such components and capable of carrying out the appropriate functionalities implemented or supported by the client device 906. As an example, a client device 906 may include any of the computing devices discussed above in relation to FIG. 9. The client device 906 may enable a network user at the client device 906 to access the network 904. The client device 906 may enable its user to communicate with other users at other client devices or systems.

In some embodiments, the client device 906 may include a web browser, such as and may have one or more add-ons, plug-ins, or other extensions. The client device 906 may render a web page based on the HTML files from the server for presentation to the user.

In some embodiments, the social networking system 902 may be a network-addressable computing system that can host an online social network. In addition, the social networking system 902 may generate, store, receive, and send social-networking data, such as, for example, user-profile data, concept-profile data, the social-graph information, or another suitable data related to the online social network. The social networking system 902 may be accessed by the other components of the network environment 900 either directly or via the network 904.

As shown, the social networking system 902 includes the digital pacing modification system 202, which is described above. The digital pacing modification system 202 may be implemented on a unitary server or a distributed server spanning multiple computers or multiple datacenters. These servers may be of various types, such as, for example and without limitation, web server, news server, mail server, message server, advertising server, file server, application server, exchange server, database server, proxy server, etc., or any combination thereof.

In some embodiments, the social networking system 902 may include one or more data stores. Data stores may be used to store various types of information. In some embodiments, the information stored in data stores may be organized according to specific data structures. Particular embodiments may provide interfaces that enable the client device 906, the social networking system 902, or the third-party system 908 to manage, retrieve, modify, add, or delete, the information stored in data stores.

In some embodiments, the social networking system 902 may store one or more social graph, described below. In one or more embodiments, the social networking system 902 may provide users with the ability to take actions on various types of items or objects, supported by social networking system 902. As an example, the items and objects may include groups or social networks to which users of the social networking system 902 may belong, events or calendar entries in which a user might be interested, computer-based applications that a user may use, transactions that allow users to buy or sell items via the customer service, interactions with advertisements that a user may perform, etc. A user may also interact with anything that is capable of being represented in the social networking system 902 or by an external system of the third-party system 908, which is separate from the social networking system 902 and coupled to the social networking system 902 via the network 904.

The social networking system 902 can include a variety of stores, modules, and/or managers as described below. In one or more embodiments, a connection manager may be used for storing connection information about users. The connection information may indicate users who have similar or common work experience, group memberships, hobbies, educational history, or are in any way related or share common attributes. The connection information may also include user-defined connections between different users and content (both internal and external). An action-logging manager may be used to receive communications from a web server about a user's actions on or off the social networking system 902. In conjunction with the action log, a third-party content object log may be maintained of user exposures to third-party content objects. An advertisement-pricing module may combine social information, the current time, location information, or other suitable information to provide relevant advertisements, in the form of notifications, to a user.

Authorization servers may be used to enforce one or more privacy settings of the users of the social networking system 902. A privacy setting of a user determines how particular information associated with a user can be shared. The authorization server may allow users to opt in to or opt out of having their actions logged by the social networking system 902 or shared with other systems (e.g., the third-party system 908), such as, for example, by setting appropriate privacy settings.

In some embodiments, the third-party system 908 may include one or more types of servers, one or more data stores, one or more interfaces, including but not limited to APIs, one or more web services, one or more content sources, one or more networks, or any other suitable components. The third-party system 908 may be operated by a different entity from an entity operating the social networking system 902 even if, in some embodiments, the social networking system 902 and the third-party systems 908 operate in conjunction with each other. In this sense, the social networking system 902 may provide a platform, or backbone, which other systems, such as the third-party systems 908, may use to provide social-networking services and functionality to users across the Internet.

In some embodiments, a third-party system 908 may include a third-party content object provider. A third-party content object provider may include one or more sources of content objects, which may be communicated to the client device 906. As an example, content objects may include information regarding things or activities of interest to the user. As another example, content objects may include incentive content objects.

Figure 10:
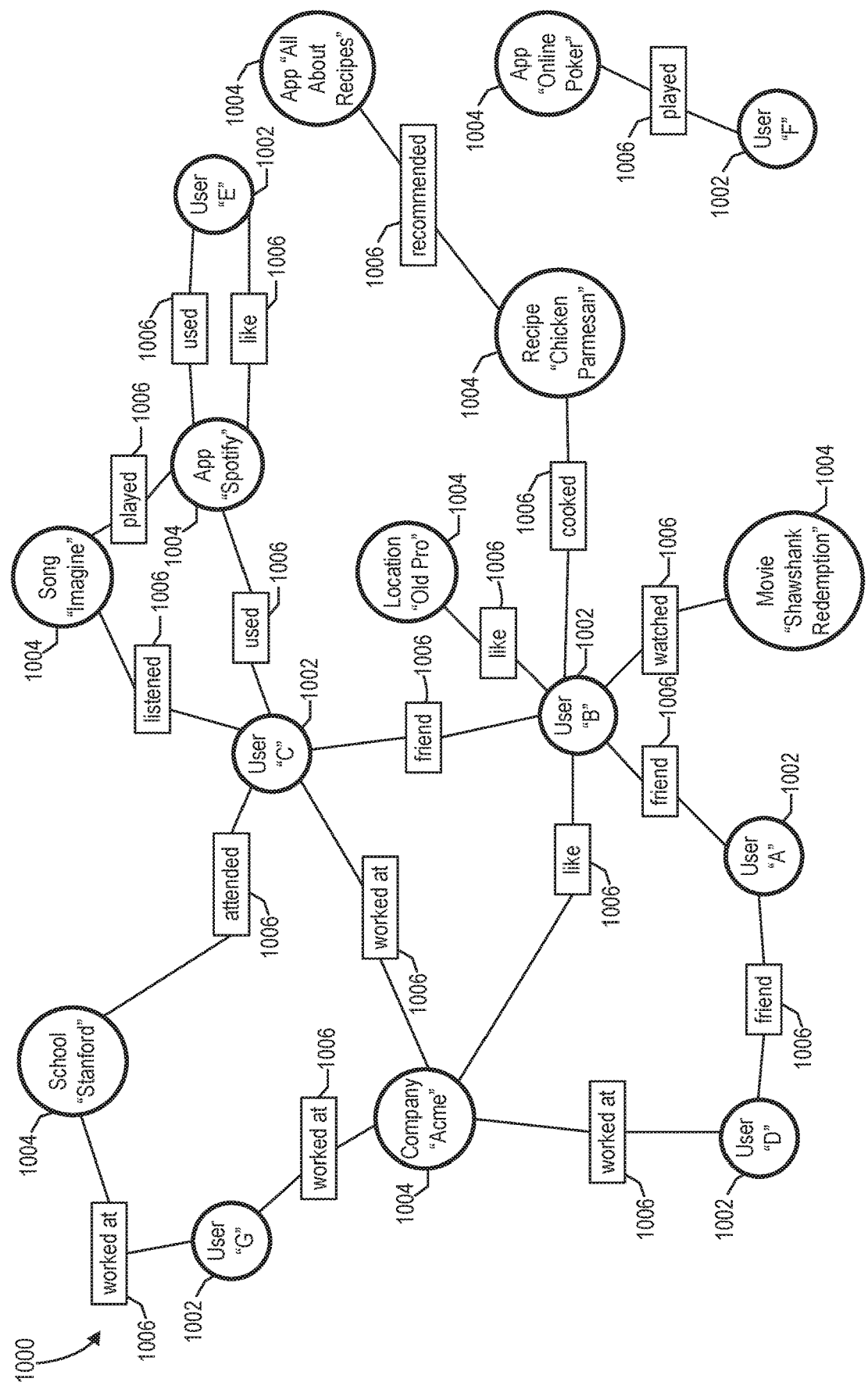
FIG. 10 illustrates an example social graph of a social networking system in accordance with one or more embodiments described herein.

FIG. 10 illustrates an example social graph 1000. In some embodiments, the social networking system 902 may store one or more social graphs 1000 in one or more data stores. In some embodiments, the social graph 1000 may include multiple nodes—which may include multiple user nodes or multiple concept nodes—and multiple edges 1006 connecting the nodes. The social graph 1000 illustrated in FIG. 10 is shown, for didactic purposes, in a two-dimensional visual map representation.

In some embodiments, a user node 1002 may correspond to a user of social networking system 902. When a user registers for an account with social networking system 902, the social networking system 902 may create a user node 1002 corresponding to the user, and store the user node 1002 in one or more data stores. Users and user nodes described herein may, where appropriate, refer to registered users and user nodes associated with registered users.

In some embodiments, a concept node 1004 may correspond to a concept. As an example, a concept may correspond to a place, a website, an entity, a resource, etc. A concept may be located within social networking system 902 or on an external server. A concept node 1004 may be associated with information of a concept provided by a user or information gathered by various systems, including the social networking system 902.

In some embodiments, a node in social graph 1000 may represent or be represented by an online profile page. Profile pages may be hosted by or accessible to social networking system 902. Profile pages may be viewable by all or a selected subset of other users. As an example, a user node 1002 may have a corresponding user-profile page where the corresponding user may add content, make declarations, or otherwise express him or herself. As another example, a concept node 1004 may have a corresponding concept-profile page in which one or more users may add content, make declarations, or express themselves, particularly in relation to the concept corresponding to concept node 1004.

As an example, an edge 1006 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships.

In some embodiments, a pair of nodes in social graph 1000 may be connected to each other by one or more edges 1006. An edge 1006 connecting a pair of nodes may represent a relationship between the pair of nodes. In some embodiments, an edge 1006 may include or represent one or more data objects or attributes corresponding to the relationship between a pair of nodes. As an example, a first user may indicate that a second user is a "friend" of the first user. In response to this indication, the social networking system 902 may send a "friend request" to the second user. If the second user confirms the "friend request," the social networking system 902 may create an edge 1006 connecting the first user's user node 1002 to the second user's user node 1002 in social graph 1000 and store edge 1006 as social-graph information in one or more of data stores.

In some embodiments, an edge 1006 between a user node 1002 and a concept node 1004 may represent a particular action or activity performed by a user associated the with the user node 1002 toward a concept associated with the concept node 1004. As an example, as illustrated in FIG. 10, a user may "like," "attended," "played," "listened," "cooked," "worked at," or "watched" a concept, each of which may correspond to an edge type or subtype.

In some embodiments, the social networking system 902, the client device 906, or the third-party system 908 may access the social graph 1000 and related social-graph information for suitable applications. The nodes and edges of social graph 1000 may be stored as data objects, for example, in a data store (such as a social-graph database). Such a data store may include one or more searchable or queryable indexes of nodes or edges of social graph 1000.

In some embodiments, an advertisement may be text (which may be HTML-linked), one or more images (which may be HTML-linked), one or more videos, audio, one or more ADOBE® FLASH® files, a suitable combination of these, or any other suitable advertisement in any suitable digital format presented on one or more web pages, in one or more e-mails, or in connection with search results requested by a user. In addition, or as an alternative, an advertisement may be one or more sponsored stories (e.g., a news feed or ticker item on the social networking system 902).

An advertisement may also include social networking system functionality with which a user may interact. As an example, an advertisement may enable a user to "like" or otherwise endorse the advertisement by selecting an icon or link associated with an endorsement. In addition, or as an alternative, an advertisement may include social networking system context directed to the user. As an example, an advertisement may display information about a friend of the user within social networking system 902 who has taken an action associated with the subject matter of the advertisement.

In some embodiments, the social networking system 902 may determine the social-graph affinity (herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity.

In some embodiments, the social networking system 902 may measure or quantify social-graph affinity using an affinity coefficient (herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions.

Coefficients may be used to predict any number of actions, which may be within or outside of the online social network. As an example, these actions may include various types of communications, such as sending messages, posting content, or commenting on content; various types of observation actions, such as accessing or viewing profile pages, media, or other suitable content; various types of coincidence information about two or more social-graph entities, such as purchasing a product from a merchant.

In some embodiments, the social networking system 902 may use a variety of factors to calculate a coefficient. These factors may include, for example, user actions, types of relationships between objects, location information, other suitable factors, or any combination thereof. In some embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user.

To calculate the coefficient of a user towards a particular object, the rating assigned to the user's actions may comprise, for example, 60% of the overall coefficient, while the relationship between the user and the object may comprise 40% of the overall coefficient. In some embodiments, the social networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof.

A coefficient may include a decay factor that causes the strength of the signal provided by particular actions to decay with time, such that actions that are more recent are more relevant when calculating the coefficient. The ratings and weights may be continuously updated based on continued tracking of the actions upon which the coefficient is based. Any process or algorithm may be employed for assigning, combining, averaging, and so forth the ratings for each factor and the weights assigned to the factors. In some embodiments, the social networking system 902 may determine coefficients using machine-learning algorithms trained on historical actions and past user responses, or data farmed from users by exposing them to various options and measuring responses.

In some embodiments, the social networking system 902 may calculate a coefficient based on a user's actions. The social networking system 902 may monitor such actions on the online social network, on the third-party system 908, on other suitable systems, or any combination thereof. Typical user actions include viewing profile pages, creating or posting content, interacting with content, joining groups, listing and confirming attendance at events, checking-in at locations, liking particular pages, creating pages, and performing other tasks that facilitate social action.

In some embodiments, the social networking system 902 may calculate a coefficient based on the user's actions with particular types of content. The content may be associated with the online social network, the third-party system 908, or another suitable system. The social networking system 902 may analyze a user's actions to determine whether one or more of the actions indicate an affinity for subject matter, content, other users, and so forth.

In some embodiments, the social networking system 902 may calculate a coefficient based on the type of relationship between particular objects. Referencing the social graph 1000, the social networking system 902 may analyze the number and/or type of edges 1006 connecting particular user nodes and concept nodes 1004 when calculating a coefficient. As an example, depending upon the weights assigned to the actions and relationships for the particular user, the overall affinity may be determined to be higher for content about a user's spouse than for content about a user's friend.

In some embodiments, the coefficient may be based on the degree of separation between particular objects. The degree of separation between any two nodes is defined as the minimum number of hops needed to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are not connected directly, but are connected through another user node (i.e., are second-degree nodes) may be described as "friends of friends." The lower coefficient may represent the decreasing likelihood that the first user will share an interest in content objects of the user that is indirectly connected to the first user in the social graph 1000.

In some embodiments, the social networking system 902 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 906 of the user). A first user may be more interested in other users or concepts that are closer to the first user. As an example, if a user is one mile from an airport and two miles from a gas station, the social networking system 902 may determine that the user has a higher coefficient for the airport than the gas station based on the proximity of the airport to the user.

In some embodiments, the social networking system 902 may perform particular actions with respect to a user based on the coefficient information. The coefficients may be used to predict whether a user will perform a particular action based on the user's interest in the action. A coefficient may be used when generating or presenting any type of objects to a user. The coefficient may also be utilized to rank and order such objects, as appropriate. In this way, the social networking system 902 may provide information that is relevant to user's interests and current circumstances, increasing the likelihood that they will find such information of interest.

In some embodiments, the social networking system 902 may generate search results based on the coefficient information. Search results for a particular user may be scored or ranked based on the coefficient associated with the search results with respect to the querying user. As an example, search results corresponding to objects with higher coefficients may be ranked higher on a search-results page than results corresponding to objects having lower coefficients.

In connection with social-graph affinity and affinity coefficients, particular embodiments may utilize one or more systems, components, elements, functions, methods, operations, or steps disclosed in U.S. patent application Ser. No. 11/503,093, filed Aug. 10, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, filed Oct. 1, 2012, each of which is incorporated by reference in their entirety.

In some embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network.

In some embodiments, one or more servers may be authorization/privacy servers for enforcing privacy settings. In response to a request from a user (or another entity) for a particular object stored in a data store, the social networking system 902 may send a request to the data store for the object. The request may identify the user associated with the request and may be sent to the user (or the client device 906 of the user) if the authorization server determines that the user is authorized to access the object based on the privacy settings associated with the object, but not otherwise.

The preceding specification is described with reference to specific exemplary embodiments thereof. The description above and drawings are illustrative and are not to be construed as limiting. The additional or alternative embodiments may be embodied in other specific forms without departing from its spirit or essential characteristics. The scope of the invention is, therefore, indicated by the appended claims rather than by the preceding description. All changes that come within the meaning and range of equivalency of the claims are to be embraced within their scope.

What is claimed is:

1. A method comprising:
generating a first pacing plan for a digital content distribution campaign executed via an online automated auction forum, wherein the first pacing plan comprises:
a first target budget allocation indicating a target budget amount to spend over a duration of the digital content distribution campaign; and
a first lower band indicating a first lower tolerance for budget spending below the first target budget allocation;
creating, based on the first pacing plan, a first bid for real-time transmission to the online automated auction forum for the digital content distribution campaign to serve digital content to a client device by comparing an actual allocated budget relative to the first lower band;
automatically detecting a service error comprising a communication fault preventing content distribution corresponding to an actual allocated budget of the digital content distribution campaign;
generating, in response to detecting the service error, a second pacing plan comprising:
a second target budget allocation utilizing the first pacing plan and the actual allocated budget relative to the target budget amount to spend over the duration of the digital content distribution campaign; and
a second lower band indicating a second lower tolerance for budget spending below the second budget allocation; and
automatically creating a second bid for real-time transmission to the online automated auction forum for the digital content distribution campaign based on the actual allocated budget and the second lower band of the second pacing plan.

2. The method of claim 1, wherein generating the second pacing plan further comprises setting the second lower band at the actual allocated budget.

3. The method of claim 2, wherein the actual allocated budget corresponds to an amount of resources utilized for the digital content distribution campaign.

4. The method of claim 1, wherein a second lower band tolerance distance separating the second lower band and the second target budget allocation varies over the duration of the digital content distribution campaign.

5. The method of claim 1, wherein generating the second pacing plan further comprises generating the second target budget allocation by transforming the first target budget allocation between an intermediary time corresponding to the actual allocated budget and a final time corresponding to a conclusion of the first pacing plan.

6. The method of claim 5, wherein generating the first pacing plan is based on characteristics of a target audience corresponding to a time period between a start time of the first pacing plan and the final time.

7. The method of claim 6, wherein transforming the first target budget allocation to generate the second target budget allocation is based on characteristics of the target audience corresponding to a time period between the intermediary time and the final time.

8. The method of claim 5, further comprising:
determining, upon identifying the service error, a second lower band tolerance that matches a first lower band tolerance of the first lower band;
generating a starting location of the second target budget allocation utilizing the lower band tolerance amount; and
applying a linear transformation to the first target budget allocation to generate the second target budget allocation utilizing the starting location of the second target budget allocation.

9. The method of claim 5, further comprising generating the second pacing plan by:
replicating a segment of the first target budget allocation of the first pacing plan between a first time of identifying the service error and a final time; and
stretching and rotating the segment of the first target budget allocation to generate the second pacing plan, wherein the second target budget allocation of the second pacing plan intersects with the first target budget allocation of the first pacing plan at the final time.

10. The method of claim 5, wherein the first pacing plan further comprises a first upper band indicating a first upper tolerance for budget spending the first target budget allocation, and wherein the second pacing plan further comprises a second upper band indicating a second upper tolerance for spending above the second target budget allocation.

11. A system comprising:
at least one processor; and
at least one non-transitory computer-readable storage medium storing instructions that, when executed by the at least one processor, cause the system to:
generate a first pacing plan for a digital content distribution campaign executed via an online automated auction forum, wherein the first pacing plan comprises:
a first target budget allocation indicating a target budget amount to spend over a duration of the digital content distribution campaign; and
a first lower band indicating a first lower tolerance for budget spending below the first target budget allocation;
create, based on the first pacing plan, a first bid for the online automated auction forum for the digital content distribution campaign to serve digital content to a client device by comparing an actual allocated budget relative to the first lower band;
detect a service error comprising a communication fault preventing content distribution corresponding to the allocated budget of the digital content distribution campaign;
generate, in response to detecting the service error, a second pacing plan comprising:
a second target budget allocation utilizing the first pacing plan and the actual allocated budget relative to the target budget amount to spend over the duration of the digital content distribution campaign; and
a second lower band indicating a second lower tolerance for budget spending below the second budget allocation; and
automatically create a second bid for real-time transmission to the online automated auction forum for the digital content distribution campaign based on the actual allocated budget and the second lower band of the second pacing plan.

12. The system of claim 11, further comprising instructions that, when executed by the at least one processor, cause the system to increase bid values as the actual allocated budget approaches the first lower band, wherein a bid value is a maximum bid value when the actual allocated budget intersects with the first lower band.

13. The system of claim 11, further comprising instructions that, when executed by the at least one processor, cause the system to decrease bid values as the actual allocated budget approaches a first upper band of the first pacing plan, wherein a bid value is a minimum bid value when the actual allocated budget intersects with the first upper band.

14. The system of claim 11, further comprising instructions that, when executed by the at least one processor, cause the system to detect the service error by comparing the actual allocated budget of the digital content distribution campaign at a given time to the first target budget allocation at the given time.

15. The system of claim 14, further comprising instructions that, when executed by the at least one processor, cause the system to detect the service error by determining, at the given time, that the actual allocated budget of the digital content distribution campaign is below the first lower band of the first target budget allocation.

16. A method comprising:
generating a first pacing plan for a digital content distribution campaign executed via an online automated auction forum, wherein the first pacing plan comprises:
a first target budget allocation indicating a target budget amount to spend over a duration of the digital content distribution campaign; and
a first lower band indicating a first lower tolerance for budget spending below the first target budget allocation;
creating, based on the first pacing plan, a first bid for real-time transmission to the online automated auction forum for the digital content distribution campaign to serve digital content to a client device by comparing an actual allocated budget relative to the first lower band;
detecting a service error comprising a communication fault preventing content distribution by detecting that an actual allocated budget of the digital content distribution campaign is below a service threshold;

generating, in response to detecting that the actual allocated budget is below the service threshold, a second pacing plan comprising:
- a second target budget allocation utilizing the first pacing plan and the actual allocated budget relative to the target budget amount to spend over the duration of the digital content distribution campaign; and
- a second lower band indicating a second lower tolerance for budget spending below the second budget allocation; and automatically creating a second bid for real-time transmission to the online automated auction forum for the digital content distribution campaign based on the actual allocated budget and the second lower band of the second pacing plan.

17. The method of claim 16, wherein the service threshold is the first lower band.

18. The method of claim 16, wherein the service threshold corresponds to an allocated budget percentage for the first pacing plan for a given time.

19. The method of claim 16, wherein creating the bid comprises setting the bid for the digital content distribution campaign to a maximum bid value based on the actual allocated budget intersecting with the second lower band.

20. The method of claim 16, wherein generating the second pacing plan further comprises generating a second target budget allocation based on transforming the first target budget allocation between an intermediary time corresponding to the actual allocated budget and a final time corresponding to a conclusion of the first pacing plan.

* * * * *